US008765894B2

(12) United States Patent  (10) Patent No.: US 8,765,894 B2
Bell et al.  (45) Date of Patent: Jul. 1, 2014

(54) NORBORNENE-TYPE POLYMERS HAVING QUATERNARY AMMONIUM FUNCTIONALITY

(75) Inventors: Andrew Bell, Lakewood, OH (US); Edmund Elce, Lakewood, OH (US); Keitaro Seto, Brecksville, OH (US)

(73) Assignee: Promerus, LLC, Brecksville, OH (US)

( * ) Notice: Subject to any disclaimer, the term of this patent is extended or adjusted under 35 U.S.C. 154(b) by 403 days.

(21) Appl. No.: 13/157,767

(22) Filed: Jun. 10, 2011

(65) Prior Publication Data

US 2011/0244368 A1  Oct. 6, 2011

Related U.S. Application Data

(63) Continuation-in-part of application No. 12/966,768, filed on Dec. 13, 2010.

(60) Provisional application No. 61/283,994, filed on Dec. 11, 2009.

(51) Int. Cl.
*C08F 32/08*  (2006.01)

(52) U.S. Cl.
USPC ............................ 526/280; 429/492; 429/501

(58) Field of Classification Search
USPC .................................. 526/280; 429/501, 492
See application file for complete search history.

(56) References Cited

U.S. PATENT DOCUMENTS

| | | | |
|---|---|---|---|
| 5,342,909 | A | 8/1994 | Grubbs |
| 6,838,489 | B2 | 1/2005 | Bell et al. |
| 7,329,758 | B1 | 2/2008 | Grubbs |
| 7,439,275 | B2 | 10/2008 | Pivovar |
| 2004/0242824 | A1 | 12/2004 | Miyaki |
| 2006/0020068 | A1* | 1/2006 | Elce et al. ............... 524/356 |
| 2006/0041093 | A1 | 2/2006 | Ravikiran et al. |
| 2007/0128500 | A1 | 6/2007 | Marsacq et al. |
| 2007/0259236 | A1 | 11/2007 | Lang |
| 2008/0145733 | A1 | 6/2008 | Asazawa |
| 2009/0253069 | A1* | 10/2009 | Melamed et al. .......... 430/270.1 |
| 2010/0108999 | A1* | 5/2010 | Mueller et al. ................. 257/40 |
| 2010/0297556 | A1* | 11/2010 | Cameron et al. ........... 430/271.1 |
| 2011/0020731 | A1* | 1/2011 | Yoshimura et al. ........... 429/483 |

FOREIGN PATENT DOCUMENTS

| | | | |
|---|---|---|---|
| EP | 2270104 A1 * | 1/2011 | |
| JP | 2009-256654 | * 11/2009 | |
| WO | WO-2005/055248 A2 * | 6/2005 | |
| WO | WO -2005/055248 A2 * | 6/2005 | |
| WO | WO-2005/061110 A1 * | 6/2005 | |
| WO | WO 2005/061110 A1 | 7/2005 | |
| WO | WO-2009/119903 A1 * | 10/2009 | |
| WO | WO 2010/138958 | 12/2010 | |

OTHER PUBLICATIONS

Yan, et.al., "Anion Exchange Membranes by Bromination of Benzylmethyl-Containing Poly(sulfone)s", Macromolecules, 2010, vol. 43, pp. 2349-2356.*
Clark, et.al, A Ring-Opening Metathesis Polymerization Route to Alkaline Anion Exchange Membranes: Development of Hydroxide-Conducting Thin Films from an Ammonium-Functionalized Monomer, J. Am. Chem. Soc., 2009, vol. 131, pp. 12888-12889.*
Robertson, et.al., "Tunable High Performance Cross-Linked Alkaline Anion Exchange Membranes for Fuel Cell Applications", J. Am. Chem. Soc., 2010, vol. 132, pp. 3400-3404.*
Clark, et.al, "A Ring-Opening Metathesis Polymerization Route to Alkaline Anion Exchange Membranes: Development of Hydroxide-Conducting Thin Films from an Ammonium-Functionalized Monomer", J. Am. Chem. Soc., 2009, vol. 131, pp. 12888-12889.
Varco, et.al., "Prospects for Alkaline Anion-Exchange Membranes in Low Temperature Fuel Cells", Fuel Cells, 2005, vol. 5(2), pp. 187-200.
C. Sollogoub, et.al., "Formation and characterization of crosslinked membranes for alkaline fuel cells", Journal of Membrane Science, 2009, vol. 335, pp. 37-42.
D. Stoica, et.al., "Anionic membrane based on polyepichlorhydrin matrix for alkaline fuel cell: Synthesis, physical and electrochemical properties", Electrochimica Acta, 2007, vol. 53, pp. 1596-1603.
Chempath, et.al., "Mechanism of Tetraalkylammonium Headgroup Degradation in Alkaline Fuel Cell Membranes", 2008, vol. 112, pp. 3179-3182.
Anttila, et.al., "Fuel Cell Technology Development and Commercialisation in Finland", National Fuel Cell Development Strategy Proposal, pp. 1-9.
Pandey, et.al., "Formation and characterization of highly crosslinked anion-exchange membranes", 2003, vol. 217, pp. 117-130.
Kostalik, et.al., "Solvent Processable Tetraalkylammonium-Functionalized Polyethylene for Use as an Alkaline Anion Exchange Membrane", Macromolecules, 2010, vol. 43, pp. 7147-7150.
Robertson, et.al., "Turnable High Performance Cross-Linked Alkaline Anion Exchange Membranes for Fuel Cell Applications", J. Am. Chem. Soc., 2010, vol. 132, pp. 3400-3404.
Wang, et al., "Preperation of alkaline anion exchange membranes based on functional poly (ether-imide) polymers for potential fuel cell applications", Journal of Membrane Science, 2009, vol. 326. pp. 4-8.
Einsla, et al., "Stability of Cations for Anion Exchange Membrane Fuel Cells", ECS Transactions, 2007, vol. 11(1), pp. 1173-1180.
Kim, et.al., "Polymer-Supported Ionic Liquids: Imidazolium Salts as Catalysts for Nucleophillic Substitutions Reactions Including Fluorinations", Angewandte Chemie, 2004, vol. 116, pp. 489-491.
Bishop, et al., "Poly(phenylethylnobornene)s and their Hydrogenated Derivatives", Macromolecular Rapid Communications, 2008, vol. 29, pp. 713-718.

* cited by examiner

*Primary Examiner* — Peter D. Mulcahy
*Assistant Examiner* — Henry Hu
(74) *Attorney, Agent, or Firm* — Balaram Gupta

(57) ABSTRACT

Embodiments of the present disclosure encompass vinyl addition and ROMP polymers having at least one type of repeating unit that encompasses a comprise $N^+(CH_3)_3OH^-$ moiety. Other embodiments in accordance with the disclosure include alkali anion-exchange membranes (AAEMs) made from one of such polymers, anion fuel cells (AFCs) that encompass such AAEMs and components of such AFCs, other than the AAEM, that encompass one of such polymers.

4 Claims, No Drawings

NORBORNENE-TYPE POLYMERS HAVING QUATERNARY AMMONIUM FUNCTIONALITY

CROSS-REFERENCE TO RELATED APPLICATION

This application is a continuation-in-part of, is entitled to and claims priority under 35 U.S.C. §120 to U.S. non-provisional patent application Ser. No. 12/966,768, filed Dec. 13, 2010, which is entitled to and claims priority to U.S. provisional application both entitled, "Norbornene-Type Polymers Having Quaternary Ammonium Functionality", having Ser. No. 61/238,994, filed Dec. 11, 2009, which are both incorporated herein by reference in their entirety.

TECHNICAL FIELD

Embodiments of the present disclosure relate generally to norbornene-type polymers having quaternary ammonium functionality and more specifically to norbornene-type vinyl addition and ROMP polymers useful for forming hydroxide-ion conducting alkali anion-exchange membranes (AAEMs) and alkali fuel cells (AFCs) encompassing a first electrode, an AAEM and a second electrode, where each electrode's active layer is in contact with the AAEM.

BACKGROUND

Alkaline fuel cells (AFCs) are one of the most developed technologies and have been used since the mid-1960s by NASA in the Apollo and Space Shuttle programs. The fuel cells on board these spacecraft provided electrical power for on-board systems, as well as drinking water and were selected because they are among the most efficient in generating electricity having an efficiency reaching almost 70%.

The NASA AFCs used an aqueous electrolyte, specifically a solution of potassium hydroxide (KOH) retained in a porous stabilized matrix. The charge carrier for an AFC is the hydroxyl ion ($OH^-$) that migrates from the cathode to the anode where they react with hydrogen to produce water and electrons. The water formed at the anode migrates back to the cathode to regenerate hydroxyl ions. The entire set of reactions is then:

Anode Reaction: $2H_2 + 4OH^- \Rightarrow 4H_2O + 4e^-$

Cathode Reaction: $O_2 + 2H_2O + 4e^- \Rightarrow 4OH^-$

Overall Net Reaction: $2H_2 + O_2 \Rightarrow 2H_2O$

Despite their high efficiency, reasonable operating temperatures and other positive attributes, the NASA AFCs were very sensitive to $CO_2$ that is likely to be present in the fuel used by the cell or environmentally. This sensitivity comes from even trace amounts of $CO_2$, CO, $H_2O$ and $CH_4$ reacting with the KOH electrolyte, poisoning it rapidly, and severely degrading the fuel cell performance by either the dilution of the electrolyte or the formation of carbonates that reduce the electrolyte's pH and hence the kinetics of the electrochemical reactions at the level of the electrodes, impairing their performance. Therefore, such AFCs were limited to closed environments, such as space and undersea vehicles, running on pure hydrogen and oxygen can be worthwhile.

On the positive side, and in addition to their high efficiency and low operating temperature, AFCs are the cheapest fuel cells to manufacture as the catalyst that is required on the electrodes can be any of a number of different materials that are relatively inexpensive compared to the noble catalysts required for other types of fuel cells. Therefore, there has been considerable interest in solving their sensitivity to poisoning, in a manner other than providing pure or cleansed hydrogen and oxygen, and take advantage of the AFCs positive attributes such as operation at relatively low temperatures and high efficiency to provide a quick starting power source and high fuel efficiency, respectively.

In recent years, interest has grown in the development of anion exchange membranes (AEMs) for use in AFCs and electrolyzers due to the low overpotentials associated with many electrochemical reactions at high pH and the potential to forego noble metal catalysts. AEMs serve as an interesting counterpoint to the more widely developed and understood proton or cation exchange membranes (PEM or CEM). However, there are no readily available anion exchange membranes that serve as a commercial standard for electrochemical applications such as DuPont's Nafion® PSFA (perfluorosulfonic acid) membranes do in the field of cation exchange membranes.

The use of anionic fuel cells based on solid polymeric anion exchange membranes (AEMs) have been demonstrated and their use in both AFCs and alkaline-membrane DMFCs (direct methanol fuel cells). Further, the use metal-free anion exchange membranes operating at elevated pH potentially lowers or eliminates the need for noble metal based catalysts and improves the kinetics of the electrochemical reactions. There are additional advantages to AEMs, and in particular to polymeric alkali anion exchange membranes (AAEMs). For example, it is likely that electrode construction and orientation limitations can be overcome for AAEMs as the conducting species would be incorporated into the fixed solid polymer AAEM. Additionally, even though some $CO_3$-2/$HCO_3^-$ formation at the anode is likely to occur, there are no mobile cations (Na+ or K+) present in the AAEM to precipitate solid crystals of metal carbonate to block or destroy the electrode layers since with AAEMs the cations are immobilized. Further, as there is no liquid caustic electrolyte present, electrode weeping and component corrosion should be minimized.

Therefore there is a need for AAEMs that have the necessary conductivity, resistance to water swelling, mechanical strength, and chemical stability at operating temperatures to provide the next generation of AFCs.

DETAILED DESCRIPTION

As previously mentioned, chemical stability, with respect to the cationic groups attached to the membrane, at operating temperatures is a property that is an area of focus focus in developing new AAEMs for fuel cells. If one were to consider an electrochemical cell without any added electrolyte, the localized pH within the ion-conducting channels of the membrane will be quite high. Also, while an AFC does does not require operating temperatures as high as what is required for fuel cells encompassing proton exchange membranes (PEMs) to achieve adequate reaction kinetics, AFCs can also benefit from operation at elevated temperatures as it is expected expected that such elevated temperatures can enhance hydroxyl transport and thus enhance fuel cell performance. However, the combination of high pH and elevated temperature can lead to chemical attack on the quaternary ammonium groups, most commonly by either an E2 (Hofmann degradation) mechanism or by an SN2 substitution substitution reaction. The elimination reaction pathway can be avoided by using quaternary ammonium groups that do not have β-hydrogens, such as the benzyltrimethylammonium group. The substitution pathway cannot be avoided so easily, and several approaches have been tried to reduce the susceptibility of the ammonium group to the substitution reaction.

Many anion exchange polymers employ quaternary ammonium groups attached to a hydrocarbon polymer backbone, and most recently, ammonium functionalized norbornene-type monomers were incorporated directly via a ring-opening metathesis polymerization (ROMP) route with dicyclopentadiene to form what is reported as mechanically strong AAEMs with high hydroxide ion conductivities and exceptional methanol tolerance, G. W. Coates et al. *J. Am. Chem. Soc.* 2009, 131, 12888-12889 (Coates I). With this method, Coates I uses the air-stable Grubbs' second generation catalyst (Ru) which enables functionalized monomers to be polymerized, R. H. Grubbs et al., *Handbook of Metathesis*, Ed.: Wiley-VCH, Weinheim, Germany, 2003, R. H. Grubbs et al., *Acc. Chem. Res.* 2001, 34, 18-29, R. H. Grubbs et al., *Angew. Chem. Int. Ed.,* 2006, 45, 3760-3765. However, ROMP copolymers of Coates I (shown below), having unsaturated C to C bonds are known to be less oxidatively stable than analogous vinyl addition polymers (Aps) that are free of such unsaturation.

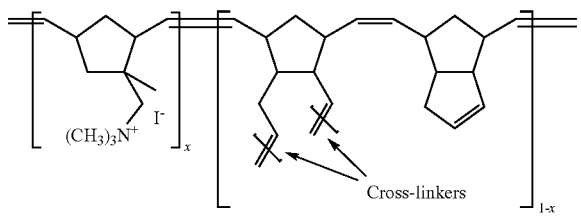

Further, while Coates I report that the thickness and properties of films made from non-hydrogenated ROMP polymers can be easily controlled by varying the amount and ratios of their Structure 1 to dicyclopentadiene (ibid. p. 12888) they also reported that the range of such variations was limited as a film with ratio greater than 1:1 (Structure 1: DCPD) demonstrated swelling and hydrogel formation, while films having the inverse ratio were not sufficiently conductive (ibid. p. 12888-12889).

Because of the exceptional functional group tolerance of Grubbs' second generation catalyst, the synthetic method of Coates I eliminated the need for post-polymerization modification, thereby allowing the facile synthesis of highly conductive and mechanically strong AAEMs. However, because of the cross-linked nature of the AAEMs, they are insoluble in all solvents limiting their utility. Thus, there there is a general need to develop non-cross-linked polymers that can offer benefits such such as (i) solvent processability, (ii) film generation, (iii) secondary film treatment, such as functionalization and crosslinking, and (iv) chemical tunability. In accordance accordance with the present disclosure, in contrast with that disclosed by Coates, tetraalkylammoniumfunctionalized polynorbornenes are solvent processable and can be be used as an AAEM. Further as such, addition polymerized polymers lack β-hydrogen β-hydrogen atom degradation from Hoffmann elimination in the hydroxide form, thus increasing the hydroxide stability over what is reported in Coates. It is also known that that the trimethylammonium groups have been shown to be reasonably stable, exhibiting exhibiting negligible degradation under alkaline conditions at elevated temperatures when properly hydrated.

The addition polymerized norbornene polymers described herein are of interest for the synthesis of highly conductive and solvent processable tetraalkylammonium functionalized polynorbornenes for use as an AAEM and as saturated polymers further impart oxidative stability compared to ROMP polymers. Additionally, the lack of β-hydrogen atoms in the AP AAEM prevents Hofmann elimination degradation from occurring in the hydroxide form, increasing the ammonium ion stability. It is also known that the trimethylammonium groups have been shown to be reasonably stable, exhibiting negligible degradation under alkaline conditions at elevated temperatures when properly hydrated.

It has also been reported by Chempath et al. in J. Phys. Chem. C, 2008, 112, 3179-3182 and Einsla et al. in ECS Transactions, 11(1) 1173-1180 (2007) that tetraalkylammonium-based cations show reasonable stability in alkaline media, i.e., benzyltrimethylammonium hydroxides displayed much better stability than the phenyltrimethylammonium hydroxides under similar conditions. Specifically it was reported that solutions of benzyltrimethylammonium cation in 1N, 3N and 5N sodium hydroxide showed little degradation after being held at 80° C. for 29 days (Einsla et al., FIG. 4, and p. 1179). Einsla et al. also explored the effect of hydration on cation stability by preparing solutions of the benzyltrimethylammonium cation in ammonium ammonium hydroxide to eliminate the presence of any sodium cations. Here sealed solutions heated to 120° C. showed more significant degradation in 48 hours than seen in in the 29 day study. Einsla et al., suggested that solvation of OH⁻ anions was important important for the stability of the head groups (ibid. p. 1178 and FIG. 5, p. 1179). Therefore it is believed likely that membrane conditions that lead to good solvation will will provide greater stability of the cations than those that lead to poor solvation.

Recently, G. W. Coates et al., J. Am. Chem. Soc. 2010, 132, 3400-3404 (Coates II), reported the use of tetraalkylammonium-functionalized cross-linkers, rather than the DCPD used in Coates I, as such new cross-linkers were found not to detract from ion concentration and thus conductivity of the material (ibid. p. 3400). In particular, Coates II is directed to the use of Compound 1:

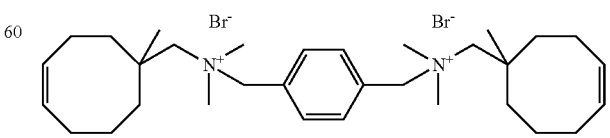

as a comonomer of cyclooctene (COE) to directly form the cross-linked polymer:

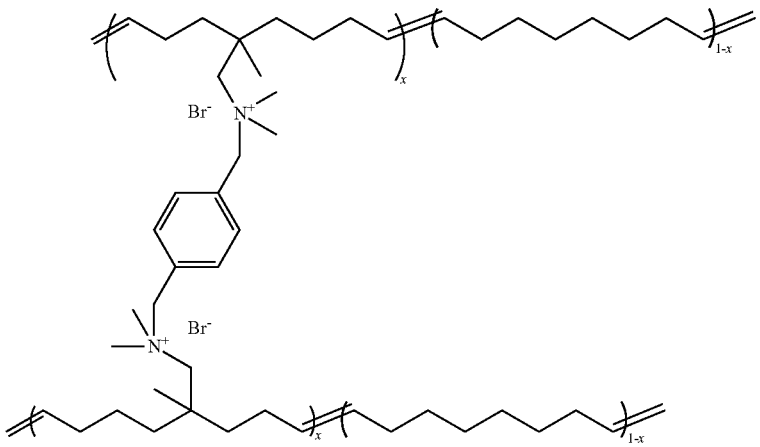

However, as was observed above for Coates I, the resulting ROMP polymer of Coates II is also unsaturated. Since the ROMP polymerization of norbornene results in in an unsaturated polymer, removal of the unsaturation leads to an additional step. Furthermore, ROMP polymers having double bonds in their backbones leads to poor thermo-oxidative stability. This shortcoming can be overcome through hydrogenation, which can modify other properties of the polymers as well. (see Register et al. in Macromol. Rapid Commun. 2008, 29, 713-718) It is clear that the polymer of Coates I I will be less oxidatively stable than a hydrogenated ROMP polymer or a saturated polymer resulting from a vinyl addition polymerization.

Thus believing that norbornene-type polymers formed by vinyl addition polymerization or by ROMP polymerization of two or more types of norbornene-type monomers, followed by hydrogenation, would provide more oxidatively stable polymers than reported by either Coates I or II, as well as providing additional flexibility in tailoring the polymer's conductive, chemical and physical properties, the polymer embodiments in accordance with the present disclosure encompass both norbornene-type vinyl addition polymers and hydrogenated norbornene-type ROMP polymers where the latter exclude copolymers of DCPD or cyclootene.

To this effect, some hydrogenated ROMP polymer embodiments of the present disclosure are hydroxide ion conducting polymers derived from two or more norbornene-type monomers where a first such monomer is represented by Formula I and a second such monomer is represented by Formula II, both shown below:

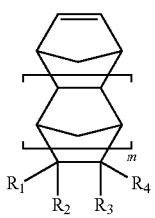

I

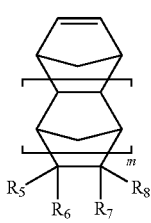

II

-continued

III where for Formula I, m is from 0 to 3, at least one of $R_1$, $R_2$, $R_3$ and $R_4$ is the pendent group represented by Formula III (alternately referred to as QAS for quaternary quaternary ammonium salt) and the others are independently a hydrogen, a $C_1$ to $C_{10}$ alkyl, an aryl or an alkyl-aryl group. For Formula II, m is as defined above and at least one of $R_5$, $R_6$, $R_7$ and $R_8$ is a substituted or unsubstituted maleimide-alkyl pendent group group where the alkyl is a $C_1$ to $C_6$ alkyl or other cross-linkable groups such as NB-ether-NB (e.g., $NBCH_2OCH_2NB$, $NBCH_2(OCH_2CH_2)_2OCH2NB$, and $NBCH_2(OCH_2CH_2)_3OCH_2NB$), NB-alkylene-NB (e.g., NB-NB, NB-Et-NB, NB-Bu-NB, and NB-Hx-NB); NB-aryl-NB (e.g., $NBC_6H_4NB$ and $NBCH_2C_6H_4CH_2NB$), and the others are independently selected from a hydrogen, a $C_1$ $C_1$ to $C_{12}$ alkyl, a terminally halogenated alkyl, an alkyl-aryl where the aryl portion is optionally halogenated or a methyl glycol ether such as $-CH_2-(OCH_2CH_2)_q-OMe$ where where q is from 1 to 4. For Formula III, R' is selected from $-(CH_2)_p-$, where p is from 0 0 to 12; Ar is an optional aromatic group having one or more aromatic rings; R" is selected from $-(CH_2)_p-$ where p is from 0 to 12, or $-(CH_2)_s-O-(CH_2)_t-$, where s and t are are independently from 1 to 6, and R" is coupled to the nitrogen of the quaternary ammonium functional group by a covalent bond, each of $R_a$, $R_b$ and $R_c$ are independently selected from a methyl, an aryl or alkyl-aryl group where the alkyl is a $C_1$ $C_1$ to $C_4$ alkyl, and v is either 1 or 2. Thus, in each ROMP polymer derived from the above monomers, there is a first type of norbornene-type repeating unit that encompasses a QAS group and a second repeating unit that encompasses a substituted or or unsubstituted maleimide-alkyl pendent group or one of the aforementioned other cross-linkable pendent groups.

With regard to vinyl addition polymer embodiments in accordance with the present disclosure, such are also hydroxide ion conducting polymers derived from two or more norbornene-type monomers where a first such monomer is represented by Formula A and a second such monomer is represented by Formula B, both shown below:

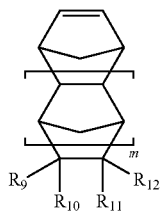

A

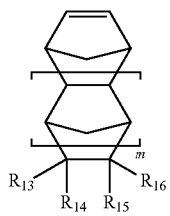

B

For Formula A, m is from 0 to 3, at least one of $R_9$, $R_{10}$, $R_{11}$ and $R_{12}$ is a functional group (FG) capable of quaternization, as discussed below, and the others are independently a hydrogen, a $C_1$ to $C_5$ alkyl, an aryl or an alkyl-aryl group. For Formula B, m is as defined above and at least one of $R_{13}$, $R_{14}$, $R_{15}$ and $R_{16}$ is a substituted or unsubstituted maleimide-alkyl pendent group where the alkyl is a $C_1$ to $C_4$ alkyl or another cross-linkable group, as described above, and the others are independently selected from a hydrogen, a $C_1$ to $C_{12}$ alkyl, an alkyl-aryl or a methyl glycol ether such as —$CH_2$—($OCH_2CH_2$)$_q$—OMe where q is from 1 to 4.

Exemplary monomers in accordance with Formula I include, but are not limited to:

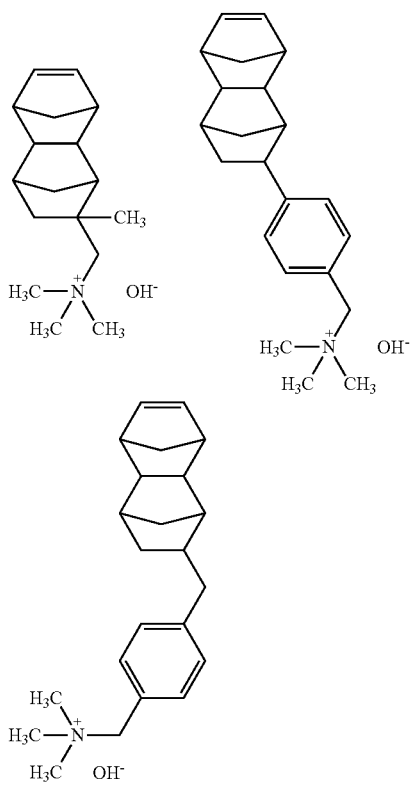

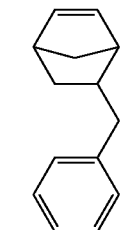

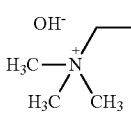

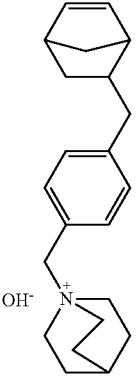 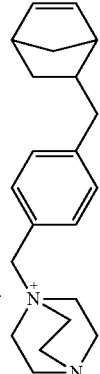 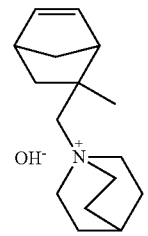

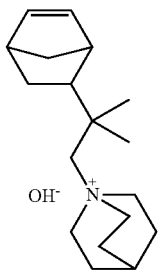

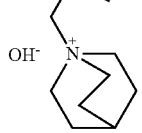

With respect to monomers in accordance Formula A, the above monomers while not directly polymerizable via vinyl addition polymerization, can be made available by post-polymerization functionalization. Additionally, it is believed that monomers that incorporate a quaternary amine such as those represented by general formulae IVa below, as well as the specific examples for each general formula that follow in exemplary formulae IVb, are suitable for embodiments in accordance with the present disclosure. Such pendent groups include:

IVa

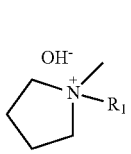 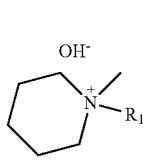 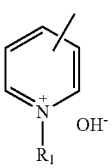

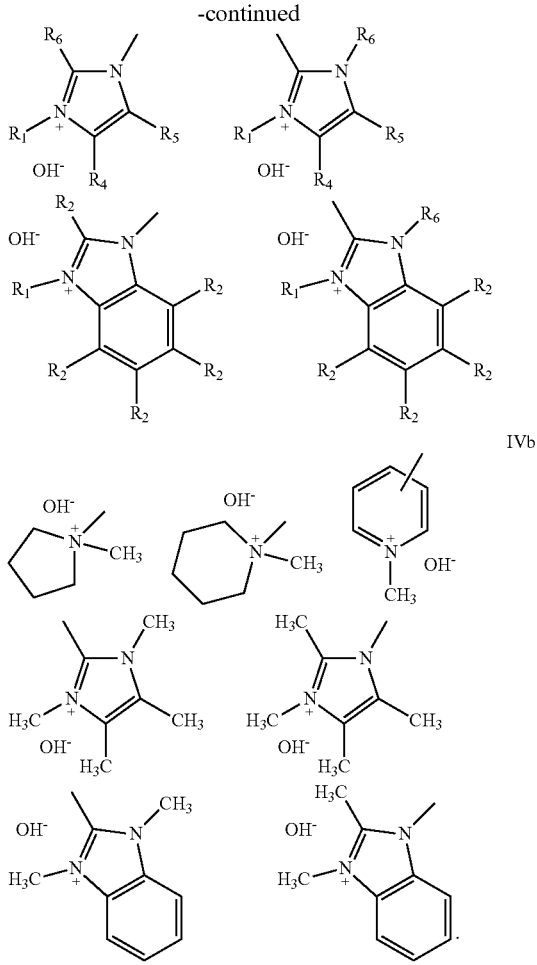

With regard to the polymerization of the above and below monomers, exemplary ROMP polymerization processes employing Ru and Os transition metal initiators are described in U.S. Pat. No. 6,838,489, which is incorporated herein by reference in its entirety; and exemplary vinyl addition polymerization processes employing Group VIII transition metal catalysts are described in US 2006/0020068 A1, which is incorporated herein by reference in its entirety.

Both the ROMP and vinyl addition polymer embodiments of the present disclosure are formed having a weight average molecular weight (Mw) that is appropriate to their use. Generally, a Mw from 5,000 to 500,000 is found appropriate for some embodiments, while for other embodiments other Mw ranges can be advantageous. For example, for some embodiments, it is advantageous for the polymer to have a Mw from at least 30,000, while in others from at least 60,000. In some embodiments, the upper range of the polymer's Mw is up to 400,000, while in others is up to 250,000. It will be understood that since an appropriate Mw is a function of the desired physical properties in the anionic polymer membrane formed therefrom, it is a design choice and thus any Mw within the ranges provided above is within the scope of the present disclosure.

While some ROMP polymer embodiments of the present disclosure can be formed formed directly from a monomer having an ammonium cation pendent group in accordance with Formula III, where a saturated polymer is desired, monomers in accordance with Formulae A and B can be contacted with a ring-opening metathesis polymerization (ROMP) initiator and the resultant unsaturated polymer hydrogenated to to a saturated polymer. This ring-opening metathesis polymerization can be accomplished in either in solution or as 100% reactive solids that is to say as a mass polymerization with little or no solvents. The following scheme exemplifies the hydrogenation of the ring-opened metathesized polymer (ROMP) followed by conversion of an aryl-alkyl halide pendent group to a quaternary ammonium salt (see the the following reaction sequence of reactions 1 (polymerization), 2 (hydrogenation), 3 (quaternization), and 4 (chloride to hydroxide metathesis)).

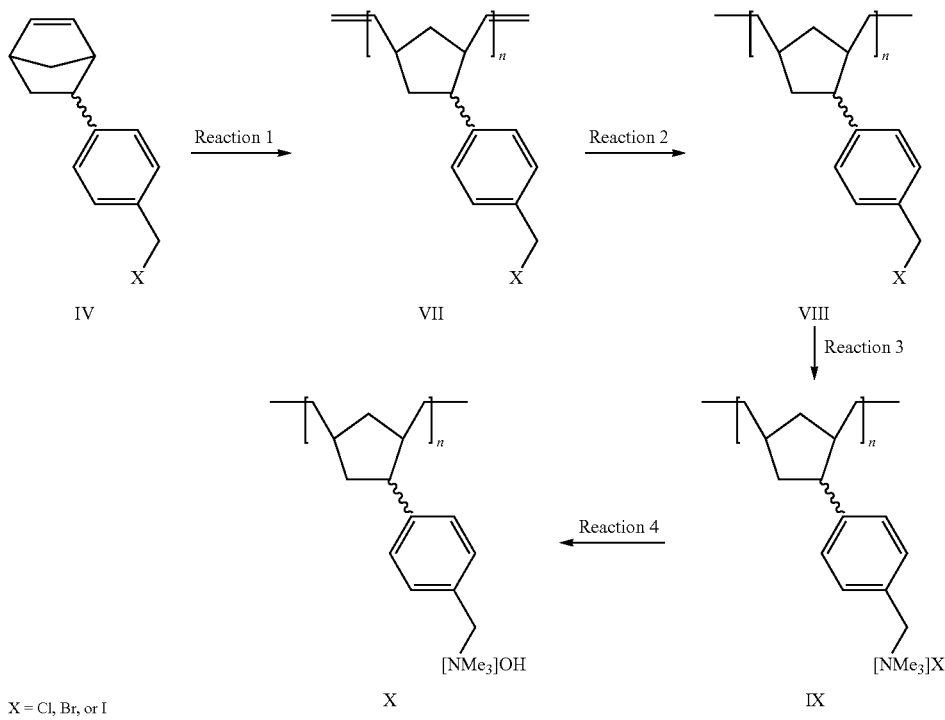

It should be understood, of course, that where an unsaturated ROMP polymer is desired, only Reaction 1 of the above scheme need be performed provided that the starting monomer is in accordance with Formula I. Such reaction sequence is as shown below:

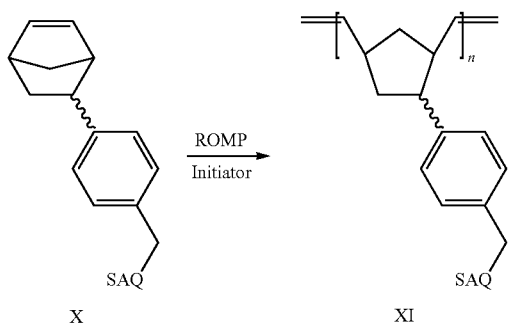

For polymer embodiments in accordance with forming a vinyl addition polymer, generally a monomer having a pendent functional group that can be quarternarized, for example an aryl-alkyl halide such as in the above Formula IV, the reaction scheme illustrated below is generally employed.

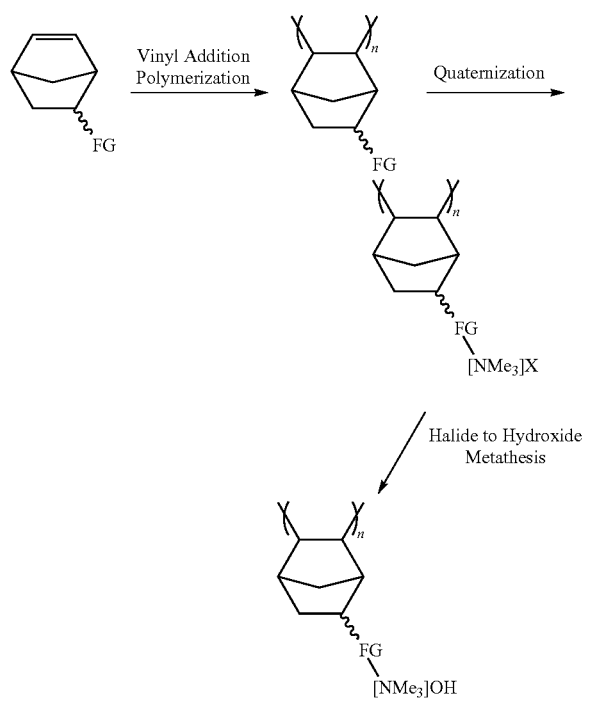

FG = Functional Group
X = Cl, Br, or I

Since, it is believed that the base stability of quaternary amine pendent groups improves as the aliphatic chain length of the alkyl substituent increases, and further as it it is believed that incorporating repeating units into a polymer with two or more quaternary amine cations allows more freedom in the selection of other repeating units units that will allow for the tailoring of polymer properties while maintaining high conductivity. Thus, unlike the limited range of monomer ratios reported in Coates I with with a DPCD copolymer, or the slightly less limited range of monomer ratios reported in in Coates II with a COE copolymer, the above vinyl addition plus post functionalization functionalization scheme of some embodiments of the current disclosure can provide for for the inclusion of monomers present in an amount sufficient to address swelling in hot hot methanol, ion exchange capacity (IEC), polymer stability, and mechanical strength strength without decreasing hydroxide ion conductivity. For example, such polymers can incorporate a higher ratio of cross-linking repeating units where repeating units containing quaternary ammonium moieties are polyfunctional. Additionally, improvements in membrane stability under alkaline conditions can be accomplished by by the incorporation of trimethylammonium groups in structures which do not possess β-hydrogen atoms, thereby preventing degradation by Hofmann elimination. Still further, as a design option, functionalized tetracyclododecene (TDFG) monomeric units units may be incorporated into the polymer backbone to effect changes in mechanical, thermal, and transport properties Exemplary repeating units that are available from the above vinyl polymerization scheme include, but are not limited to, the following:

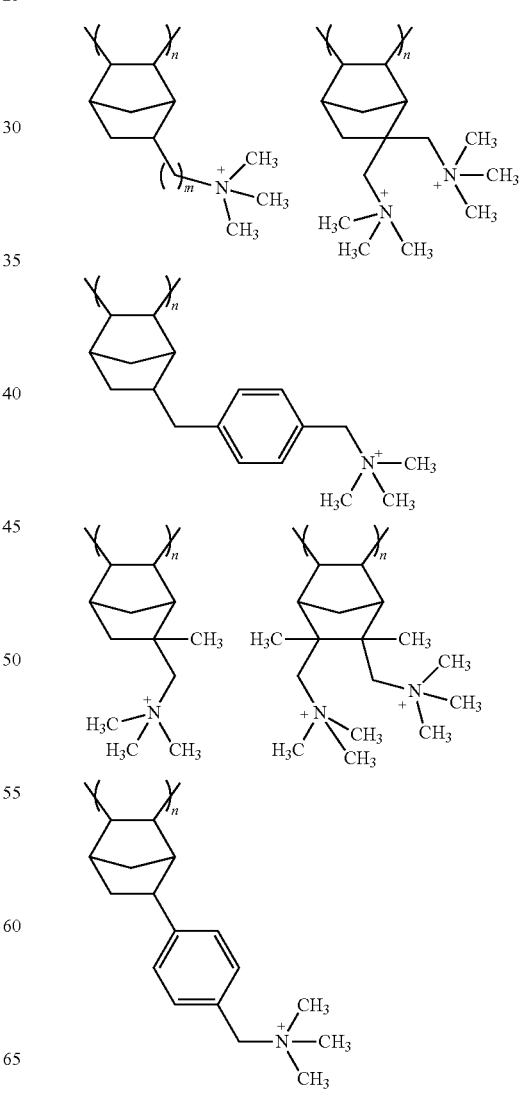

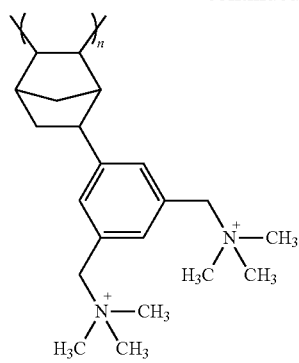

m = 1-6

Further to the vinyl addition polymerization plus post-functionalization scheme, the initial monomer can be, for example NBPhCH$_2$X (where X is selected from Cl, Br, or or I). That is to say that the functional group of that first type of monomer is an aryl-halogenated-alkyl. This polymerization can be performed in solution employing a a nickel initiator/catalyst Ni(Toluene)(C$_6$F$_5$)$_2$ or an in-situ generated nickel initiator/catalyst) or a palladium catalyst, such as [Pd(P-i-Pr$_3$)$_2$(NCCH$_3$)(OAc)][B(C$_6$F$_5$)$_4$] or [Pd(PCy$_3$)$_2$(NCCH$_3$)(H)][B(C$_6$F$_5$)$_4$] or an in-situ generated palladium catalyst) to generate the saturated polymer shown. Quaternization of these halogenated groups can be effected through appropriate contacting with trimethylamine (N(CH$_3$)$_3$) (e.g., immersing in a solution of 40-75% trimethylamine at room temperature for a time sufficient to result in the desired degree degree of amination). That is to say that the halogen of the pendent group is replaced by by the quaternary ammonium function N$^+$(CH$_3$)$_3$ and a halogen counter-ion which is replaced by a hydroxide ion.

Still further to the vinyl addition polymerization plus post-functionalization scheme, monomers having a particular exo- or endo-configuration can be polymerized to form repeating units that retain the original configuration, see the exemplary repeating units provided below. It should be understood that through the use of such configuration specific monomers, some physical and chemical properties of the resulting polymers can be altered from that which would be provided if the diastereomeric mixture of such monomers has been employed.

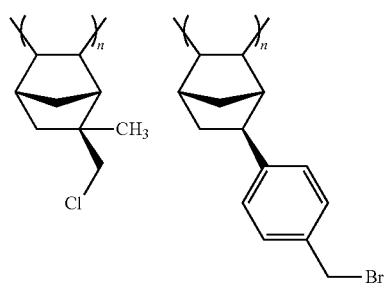

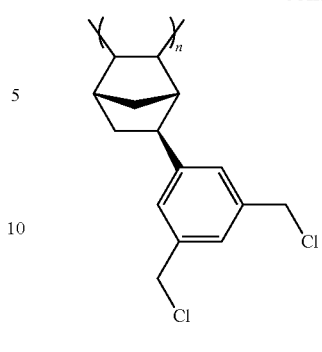

The norbornene monomers useful for the preparation of the quaternary ammonium ammonium containing vinyl polymerized polynorbornenes can be generated, as exemplified below, by the (i) Diels-Alder reaction of cyclopentadiene and α,ω-halogen α,ω-halogen olefins, those containing a terminal olefin and a terminal halogen, such as as 4-chloro-1-butene, chloromethylstyrene, or 1-(chloromethyl)-4-(2-propenyl)benzene; (ii) hydroarylation of norbornadiene in the presence of a palladium catalyst and haloarene (e.g., 1-(bromomethyl)-4-iodobenzene to to yield NBPhCH$_2$Br XXIV-a); and (iii) by reduction of norbornene carboxaldehydes, carboxylic acids, carboxylic acid esters, and nitriles to norbornene hydroxyls which are are readily converted to chloro, bromo, or iodo alkyls, i.e., NB(endo-CH$_3$)(exo-CO$_2$H)NB(endo-CH$_3$)(exo-CO$_2$H)→NB(CH$_3$)(CH$_2$OH)→NB(CH$_3$)(CH$_2$Cl) or NBCN→NBCHO→NBCH$_2$OH→NBCH$_2$Cl.

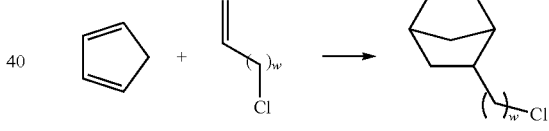

XVIII-a w = 1-6

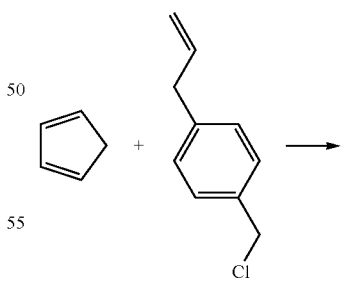

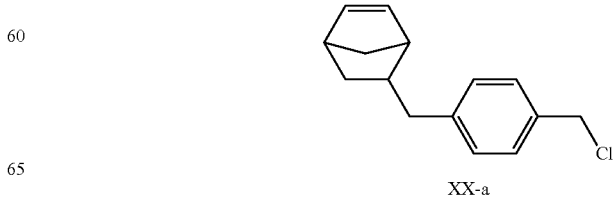

XX-a

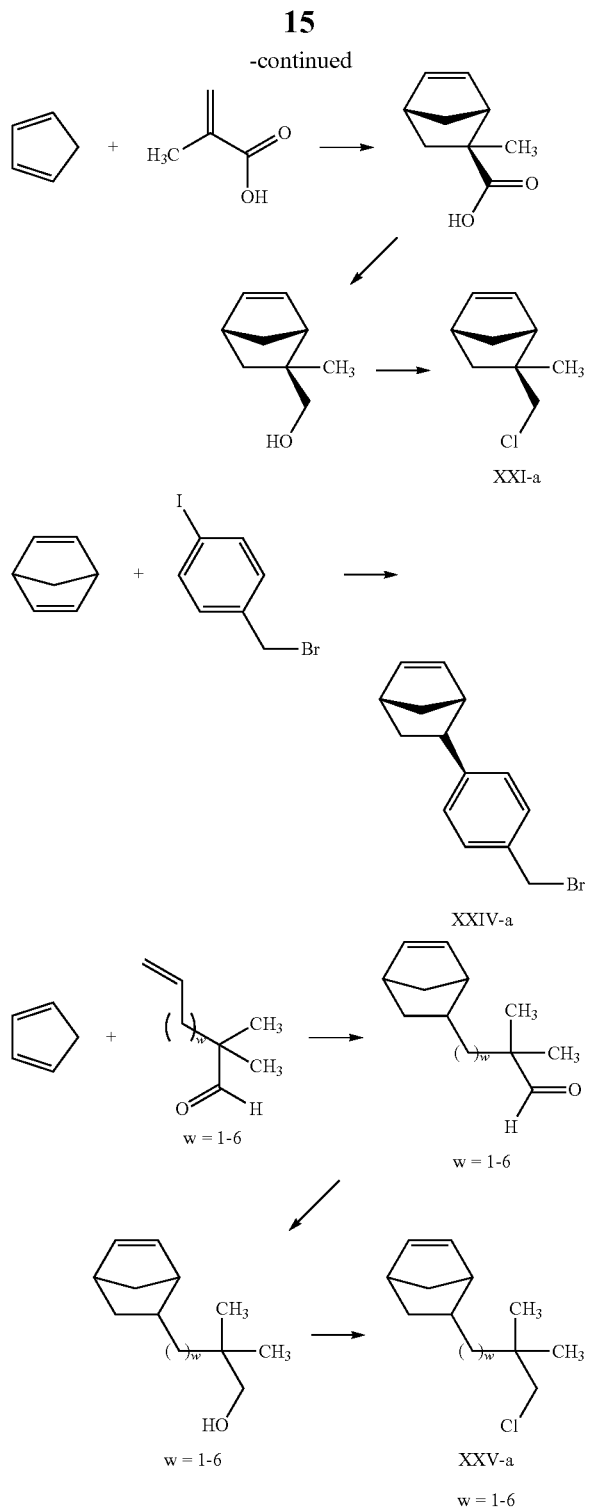

accordance with the present disclosure are made to take advantage of such differences by using monomers that are either a mixture of isomers that is rich in the advantageous isomer or are essentially the pure advantageous isomer. The XXI-a and XXII-a structures exemplified are embodiments of this disclosure where the monomer employed possesses an exo-substituted functional group and as such is anticipated as being more readily polymerized and converted to the quaternary ammonium salt.

In some embodiments, the base stability of the quaternary amines can be improved, for example in compound XI, by increasing the aliphatic chain length of the alkyl substituent, $NB(CH_2)n[NMe_3]Cl$ (n=1-6). Improvements in base properties are, for example, low swelling in hot methanol, high ion exchange capacity (IEC), good hydroxide ion conductivity, polymer stability, and mechanical strength.

Compounds XIX through XXIV have improved membrane stability under alkaline conditions compared to compound XVI because the incorporation of trimethylammonium groups in structures which do not possess β-hydrogen atoms thus preventing degradation by Hofmann elimination.

In other embodiments, the polymers will be substituted with a single alkyl trimethylammonium cation per polycyclic structure, but by appropriate selection of a functional norbornene additional quaternary ammonium moieties may be introduced to to improve ion conductivity. The mechanical strength of the films is adjusted via the incorporation of one or more functional norbornene monomers, such as alkylNB (e.g., decylNB, hexylNB, butylNB); methyl glycol ether NB (e.g., $NBCH_2(OCH_2CH_2)_2OMe$ $NBCH_2(OCH_2CH_2)_2OMe$ and $NBCH_2(OCH_2CH_2)_3OMe$); NB-ether-NB (e.g., $NBCH_2OCH_2NB$, $NBCH_2(OCH_2CH_2)_2OCH_2NB$, and $NBCH_2(OCH_2CH_2)_3OCH_2NB$), $NBCH_2(OCH_2CH_2)_3OCH_2NB$), NB-alkylene-NB (e.g., NB-NB, NB-Et-NB NB-Bu-NB, and NB-Hx-NB); NB-aryl-NB (e.g., $NBC_6H_4NB$ and $NBCH_2C_6H_4CH_2NB$); and maleimide-alkyl-NB (e.g., NBMeDMMI, NBPrDMMI, NBBuDMMI, and NBHxDMMI), which may be crosslinked in either 100% reactive solids polymerization, or via acid or base catalyzed, thermal, and photochemical reactions of polynorbornene films.

In other embodiments in accordance with the present disclosure, the use of a difunctional amine, polycyclic amine or dendrimer polyamine, or a cyclic diamine, such as DABCO (1,4-diazabicyclo(2,2,2)octane), can be employed during film casting as a crosslinker unit to create ammonium functions that are less sensitive to the Hoffman elimination reaction and the substitution by hydroxyl group, and it allows for the thermal crosslinking via its second nitrogen. Quinuclidine has a structure that is similar to that of DABCO which confers a good resistance with respect to Hoffman degradation and nucleophilic substitution by OH⁻ ion. The method to produce crosslinked films is exemplified as follows:

While each formula XVIII-a, XX-a and XXV-a, provided above, are depicted without indication of any stereochemistry, it should be noted that generally each of these monomers and other monomers produced for the purpose of this disclosure, unless indicated otherwise, are obtained as diastereomeric mixtures that retain their configuration when converted into repeating units. As previously noted and discussed, the exo- and endo-isomers of such diastereomeric mixtures can have slightly different chemical and physical properties, it should be further understood that some embodiments in

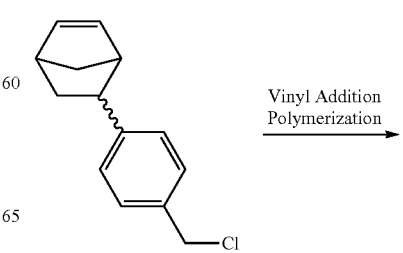

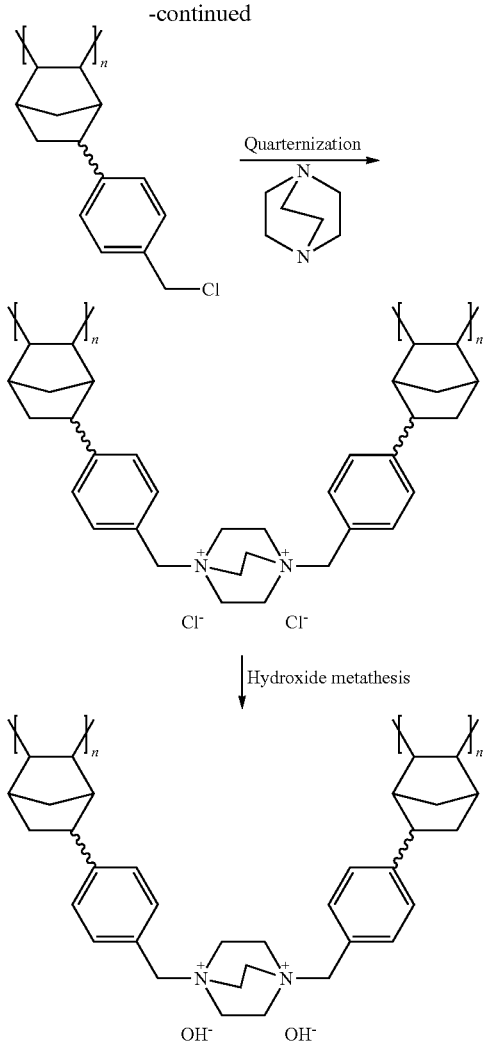

Other cross-linker moieties that can be employed during film casting include, among others, bis(dimethylamino) moieties such as: 1,4-diazabicyclo[2.2.2]octane, 2-methyl-1,4-diazabicyclo[2.2.2]octane, $N^1,N^1,N^3,N^3$-tetramethyl-1,3-propanediamine, $N^1,N^1,N^3,N^3$-tetramethyl-1,3-propanediamine, $N^1,N^1,N^3$-2-tetramethyl-1,3-propanediamine, $N^1,N^1,N^3,N^3$-2-pentamethyl-1,3-propanediamine, $N^1,N^1,N^3,N^3$-tetramethyl-1,3-butanediamine, $N^1,N^1,N^2,N^2$-tetramethyl-1,2-propanediamine, $N^1,N^1,N^3,N^3$,2,2-hexamethyl-1,3-propanediamine, $N^1,N^1,N^6,N^6$-tetramethyl-1,6-hexanediamine, $N^1,N^1,N^{10},N^{10}$-tetramethyl-1,10-decanediamine, $N^1,N^1,N^{12},N^{12}$-tetramethyl-1,12-dodecanediamine, $N^1,N^1,N^3,N^3$-tetramethyl-1,3-butanediamine, $N^3$-[2-(dimethylamino)ethyl]-$N^1,N^1$-dimethyl-1,3-propanediamine, $N^1$-[2-(dimethylamino)ethyl]-$N^1,N^1$-(1-methylethyl)-1,3-propanediamine, $N^1$-[2-(dimethylamino)ethyl]-$N^2,N^2$-dimethyl-1,2-propanediamine, $N^1,N^1,N^4,N^4$-tetramethyl-1,4-benzenedimethanamine, 4-[2-(dimethylamino)ethyl]-N,N-dimethylbenzenemethanamine, $N^1,N^1,N^3,N^3$-tetramethyl-1,3-benzenedimethanamine, $N^1,N^1,N^4,N^4$-tetramethyl-1,4-cyclohexanedimethanamine, and $N^1,N^1,N^4,N^4$-tetramethylbicyclo[2.2.2]octane-1,4-dimethanamine.

Aromatic cross-linker moieties include, but are not limited to, $N^3,N^3,N^6,N^6$-tetramethyl-3,6-Phenanthrenedimethanamine, $N_9,N_9,N_{10},N_{10}$-tetramethyl-9,10-Anthracenedimethanamine, $N_1,N_1,N_5,N_5$-tetramethyl-1,5-Naphthalenedimethanamine, $N^2,N^2,N^6,N^6$-tetramethyl-2,6-Naphthalenedimethanamine, $N^1,N^1,N^8,N^8$-tetramethyl-1,8-Naphthalenedimethanamine, $N^2,N^2,N^6,N^6$-tetramethyl-1,8-Naphthalenedimethanamine, $N^1,N^1,N^4,N^4$-tetramethyl-1,4-Benzenedimethanamine, $N^1,N^1,N^3,N^3$-tetramethyl-1,3-Benzenedimethanamine, $N^1,N^1,N^2,N^2$-tetramethyl-1,2-Benzenedimethanamine, $N^4,N^4,N^{4'},N^{4'}$-tetramethyl-[1,1'-Biphenyl]-4,4'-dimethanamine, $N^5,N^5,N^{14},N^{14}$-tetramethyl-Tricyclo[9.3.1.14,8]hexadeca-1(15),4,6,8(16),11,13-hexaenene-5,14-dimethanamine and 9,10-dihydro-$N^2,N^2,N^7,N^7$-tetramethyl-2,7-Anthracenediamine, 2,7-bis[(dimethylamino)methyl]-9,10-Anthracenedione, 2,6-bis[(dimethylamino)methyl]-9,10 Anthracenedione, 9,10-dihydro-$N^2,N^2,N^6,N^6$-tetramethyl-2,6-Anthracene dimethanamine, $N^3,N^3,N^6,N^6$-tetramethyl-9H-Fluorene-3,6-diamine, 2,6-bis[(dimethylamino)methyl]-1,5-dihydroxy-9,10-Anthracenedione.

Still other cross-linker moieties can be employed during film casting include, among others, dibromo, chloro/bromo, tri-bromo, iodo and chloro moieties such as: 1,2-dibromopropane, 1,2-dibromoethane, 1,2,3-tribromopropane, 1,3-dibromobutane, 1,3-dibromobutane, 1,3-dibromo-2,2-dimethylpropane, 2,4-dibromopentane, 1,4-dibromobutane, 1-bromo-3-(bromomethyl)octane, 2,5-dichloro-2,5-dimethylhexane, 2-bromo-4-(2-bromoethyl)octane, 1,5-dibromooctane, 1-bromo-4-(bromomethyl)octane, 1-bromo-3-(2-bromoethyl)heptane, 1-bromo-3-(2-bromoethyl)-4,4-dimethylpentane, 2,5-dibromohexane, 1,4-dibromo-heptane, 2,4-dibromo-2-methylpentane, 1,10-dibromoundecane, 1-bromo-3-(2-bromoethyl)-4,4-dimethylpentane, 2-bromo-4-(2-bromoethyl)octane, 1,5-dibromo-3,3-dimethylpentane, 1-bromo-4-(bromomethyl)octane, 1-bromo-3-(2-bromoethyl)heptane, 1-bromo-3-(bromomethyl)octane, 1,10-dibromodecane, 1,11-dibromoundecane, 1,10-dibromoundecane, 2,4-bis(bromomethyl)pentane, 1,12-dibromododecane, 1,13-dibromotridecane, 1,5-dibromo-3-methylpentane, 1,8-dibromooctane, 1,9-dibromononane, 1,5-dibromooctane, 1,2-dibromododecane, 1,4-bis(bromomethyl)cyclohexane, 1,2,6-tribromohexane, 1,2,5,6-tetrabromohexane, 1,4-bis(bromomethyl)bicyclo[2.2.2]octane, 1,1-bis(bromomethyl)cyclohexane, 1,1-bis(bromomethyl)cyclooctane, 1,1-bis(bromomethyl)-2-methylcyclohexane, trans-1,4-bis(1-bromo-1-methylethyl)cyclohexane, 1,4-bis(1-bromo-1-methylethyl)cyclohexane, 1,3,5-tris(bromomethyl)-1,3,5-trimethylcyclohexane, cis-1,5-bis(bromomethyl)cyclooctane, trans-1,2-Bis(bromomethyl)cyclohexane, trans-1,5-bis(bromomethyl)cyclooctane, 1,1-bis(bromomethyl)cycloheptane, 1,4-bis(bromomethyl)benzene, 1-(bromomethyl)-4-(chloromethyl)benzene, 1-(2-bromoethyl)-4-(bromomethyl)benzene, 1,3-diiodo-2,2-dimethylpropane, 1,3-diiodo-2,2-bis(iodomethyl)propane, 1,3-diiodopropane, 1-bromo-3-chloro-2-methylpropane, 1,3-dibromo-2-methylpropane, 1,5-diiodo-3-methylpentane, 1,4-diiodobutane, 1,3-diiodopentane, 1,5-diiodopentane, 1,5-diiodopentane, 1-chloro-3-iodopropane, 1-bromo-3-iodopropane, 1,3-dichloro-2,2-dimethylpropane, 1,4-bis(chloromethyl)cyclohexane, 1,4-bis(iodomethyl)benzene, 4-bis(2-iodoethyl)benzene; and 1,2-bis(iodomethyl)benzene.

Yet other cross-linker moieties include: $N^1,N^2$-bis[2-(dimethylamino)ethyl]-$N^1,N^2$-dimethyl-1,2-Ethanediamine $N^1,N^1$-bis[2-(dimethylamino)ethyl]-$N^2,N^2$-dimethyl-1,2-Ethanediamine $N^1$-[2-(diethylamino)ethyl]-$N^2,N^2$-diethyl-$N^1$-methyl-1,2-Ethanediamine $N^1$-[2-(dimethylamino)ethyl]-$N^1,N^2,N^2$-trimethyl-1,2-Ethanediamine N-[(dimethylamino)methylethyl]-N,N',N'-trimethyl-1,2-

Propanediamine N¹-[2-[[2-(dimethylamino)ethyl]methylamino]ethyl]-N¹,N³,N³-trimethyl-1,3-Propanediamine N¹,N³-bis[2-(dimethylamino)ethyl]-N¹,N³-dimethyl-1,3-Propanediamine, and 3-[2-(dimethylamino)ethyl]-N¹,N¹,N⁵,N⁵,3-pentamethyl-1,5-Pentanediamine To further illustrate such cross-linking moieties, the following are structural representations of some of the of the above named moieties:

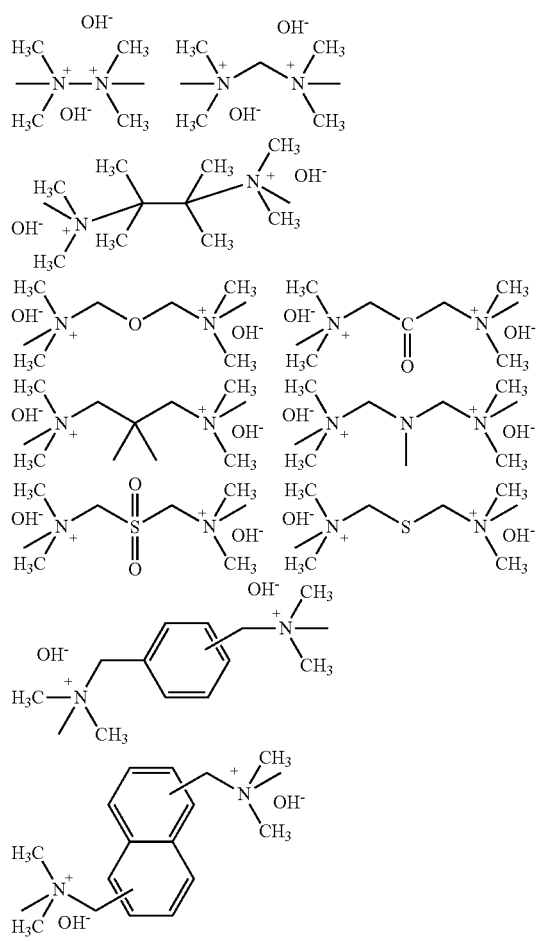

The following examples are provided to further illustrates aspects of some embodiments of the present disclosure. It should be understood that such examples are in no way limiting to the scope of such embodiments and are presented for illustrative purposes only.

MONOMER SYNTHESIS EXAMPLES

Example M1

Synthesis of Endo-5-Methyl-Exo-5-Carboxylic Acid-2-Norbornene

Freshly cracked cyclopentadiene (939 grams, 14.2 moles) and methacrylic acid (1203 grams, 14.2 moles) were added to an appropriately sized container containing a magnetic stirrer. The contents were stirred for 24 hours and then left to stand without stirring for 60 hours, over which time a white powder was observed to precipitate from from solution. To encourage precipitation, the flask was cooled at 10° C. for several hours. The precipitate was collected by vacuum filtration and rinsed with cold pentane pentane (2 L, −10° C.) to remove any un-reacted starting material and any NB(exo-Me)(endo-$CO_2H$) by product that may have formed. The precipitated white powder (700 g) was recrystallized in hexanes (~50 wt %) to give transparent crystals of of NB(endo-Me)(exo-$CO_2H$) (621 g, 29%) upon cooling over 24 hours.

The monomer was characterized by $^1H$ NMR and $^{13}C$ NMR. The numbering system shown in the following figure was used for the assignment of the NMR signals.

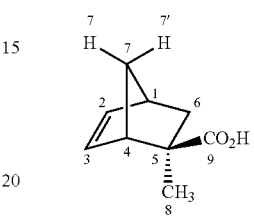

$^1H$ NMR (500 MHz, $CDCl_3$): δ (ppm)=6.25 (dd, 1H, J=5.59 & 2.96, $H_{2\&3}$), 6.12 (dd, 1H, J=5.59 & 3.17, $H_{2\&3}$), 3.07 (s, 1H, $H_{1\&4}$), 2.86 (s, 1H, $H_{1\&4}$), 2.45 (dd, 1H, J=12.02 & 3.96, $H_7$), 1.48 (m, 2H, $H_6$), 1.18 (m, 3H, $H_8$), 0.89 (m, 1H, J=12.02, $H_{7'}$). $^{13}C$ NMR (125.6 MHz, $CDCl_3$): δ (ppm)= 186.03, 139.03, 133.82, 50.71, 49.77, 49.32, 43.13, 37.64 and 24.49.

Example M2

Synthesis of Endo-5-Methyl-Exo-5-Methyl Hydroxy-2-Norbornene

NB(endo-Me)(exo-$CO_2H$) (174.8 g, 1.15 mmol) and anhydrous toluene (1000 mL) mL) were added to an appropriately sized container and kept under nitrogen. The container was equipped with a magnetic stirrer bar, thermometer, addition-funnel and condenser. A pre-mix of Vitride® (500 g, 70 wt % in toluene, 1.73 mol) was added to the the addition funnel (short exposure to air is acceptable if <2 minutes). With the container submerged in an ice-water bath, the dilute Vitride® was added dropwise over 3 over 3 hours while maintaining pot temperature between 5-20° C. After the addition was was complete, the contents were heated to 100° C. for 6 hours (until thin layer chromatography (TLC) indicated a completed reaction). The contents were allowed to to cool overnight. The solution was slowly added to a beaker containing vigorously stirring 5N HCl (1000 mL). The temperature was maintained <20° C. with the aid of an an ice-bath. The mixture was transferred to a separatory funnel once turbidity decreased. The organic phase was then diluted with diethyl ether (1.0 L) and the aqueous aqueous phase was discarded. The organics were washed with a solution of 1N HCl (3×300 mL), 15 wt % aqueous potassium bicarbonate (3×300 mL) and water (500 mL). Following, the organics were dried over $MgSO_4$, then filtered, and the solvent removed removed under reduced pressure to yield NB(endo-Me)(exo-$CH_2OH$) (152 g, 96%, in >>95% purity).

The monomer was characterized by $^1H$ NMR and $^{13}C$ NMR. The numbering system shown in the following figure was used for the assignment of the NMR signals.

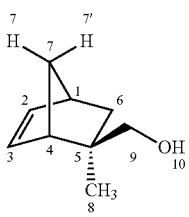

$^1$H NMR (300 MHz, CDCl$_3$): δ (ppm)=6.12 (m, 2H, H$_{2\&3}$), 3.56 (m, 2H, H$_9$), 2.76 (bs, 1H, H$_{1\&4}$), 2.55 (bs, 1H, H$_{1\&4}$), 2.14 (m, 1H, H$_{10}$), 1.55 (d, 1H, J=8.62, H$_6$), 1.44 (m, 1H, J=11.72 & 3.71, H$_7$), 1.35 (d, 1H, J=8.62, H$_6$), 0.91 (s, 3H, H$_8$), 0.77 (m, 1H, J=11.72 & 2.68, H$_7$). $^{13}$C NMR (75 MHz, CDCl$_3$): δ (ppm)=136.75, 135.68, 72.26, 47.85, 47.61, 43.70, 37.34, 22.87.

Example M3

Synthesis of Endo-5-Methyl-Exo-5-Methoxy-Mesylate-2-Norbornene

NB(endo-Me)(exo-CH$_2$OH) (74.8 g, 540 mmol) was dissolved in 250 ml dichloromethane in appropriately sized container. Methanesulfonyl chloride (MSCl) (65.6 g, 0.54 mol) was added. The mixture was then cooled to −12.5° C. with a methanol-ice bath. Triethylamine (65.6 g, 650 mmol) was added slowly dropwise while while maintaining the reaction temperature below −1.0° C. Copious white solids precipitated. The addition was complete after 30 minutes. The reaction warmed to 14° C. for 40 minutes. GC analysis showed all starting material had been consumed. The The mixture was treated with 200 ml water and the phases separated. The organic phase phase was washed with 200 ml 1N HCl followed by brine until the washing gave pH~6. pH~6. The organic portion was dried over anhydrous magnesium sulphate, filtered, and and rotary evaporated to give 100 g (90% yield) of NB(endo-Me)(exo-CH$_2$OMs) as a pale orange liquid.

The monomer was characterized by $^1$H NMR. The numbering system shown in the following was used for the assignment of the NMR signals.

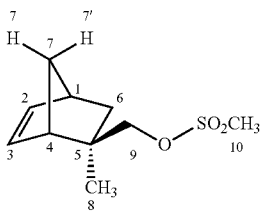

$^1$H NMR (400 MHz, CDCl$_3$): δ (ppm)=6.11 (m, 1H, H$_{2\&3}$), 6.10 (m, 1H, H$_{2\&3}$), 4.10 (s, 2H, H$_9$), 2.96 (s, 3H, H$_{10}$), 2.78 (s, 1H, H$_{1\&4}$), 2.57 (s, 1H, H$_{1\&4}$), 1.48 (m, 2H), 1.39 (m, 1H), 0.91 (s, 3H, H$_s$), 0.80 (m, 1H, H$_7$).

Example M4

Synthesis of Endo-5-Methyl-Exo-5-Bromomethyl-2-Norbornene

NB(endo-Me)(exo-CH$_2$OMs) (10.3 g, 46.3 mmol), anhydrous lithium bromide (6.2 g, 69.4 mmol), and 100 ml 2-pentanone were mixed together at room temperature to to give a yellow solution. The mixture was refluxed for two hours and then allowed to stir at room temperature overnight. Water was added to dissolve the salts. Ethyl acetate acetate was added and mixed. The phases were separated and the aqueous phase was extracted with 2×100 ml ethyl acetate. The organic portions were dried over anhydrous anhydrous sodium sulfate, filtered, and rotary evaporated to give a brown oil and solid. solid. The crude product was shown to contain a ratio ofNB (endo-Me)(exo-CH$_2$OMs): NB(endo-Me)(exo-CH$_2$OMs): NB(endo-Me)(exo-CH$_2$Br)=1:3 respectively by $^1$H NMR. The crude product was purified via column chromatography on silica gel (35 g) and cyclohexane (250 mL) to give clear, colorless oil. R$_f$(cyclohexane)=0.80. Yield=65%.

The monomer was characterized by $^1$H NMR and $^{13}$C NMR. The numbering system shown in the following figure was used for the assignment of the NMR signals.

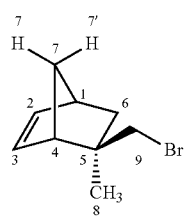

$^1$H NMR (400 MHz, CDCl$_3$): δ (ppm)=6.15 (dd, 1H, J=5.60 & 2.80, H$_3$), 6.11 (dd, 1H, J=5.60 & 3.20, H$_2$), 3.56 (s, 1H, H$_8$), 2.82 (s, 1H, H$_4$), 2.65 (s, 1H, H$_1$), 1.65 (dd, 1H, J=11.98 & 3.75, H$_7$), 1.54 (d, 1H, J=8.91, H$_6$), 1.42 (d, 1H, J=8.91, H$_6$), 1.01 (s, 1H, H$_9$), 0.97 (dd, 1H, J=12.98 & 2.72, H$_7$). $^{13}$C NMR (101 MHz, CDCl$_3$): δ (ppm)=137.09 (C$_2$), 135.78 (C$_3$), 50.24 (C$_4$), 48.29 (C$_8$), 47.96 (C$_6$), 43.68 (C$_1$), 40.16 (C$_7$), 27.15 (C$_5$), 24.86 (C$_9$).

Example M5

Synthesis of Endo-/Exo-bromobutylnorbornene

Endo-/Exo-Norbornenebutyl Mesylate:

5-(2-hydroxybutyl)norbornene (1000 g, 6 mol), 2000 ml dichloromethane, and methanesulfonyl chloride (723.4 g, 6.32 mol) were were added to an appropriately sized container equipped with a thermowell, nitrogen inlet, addition funnel and mechanical stirrer. An additional 500 mL dichloromethane was added to rinse in the methanesulfonyl chloride (MsCl). The stirred mixture was chilled to −14.0° C. with a dry ice-isopropanol cooling bath. Triethylamine (733.6 g, 7.26 7.26 mol) was added rapidly dropwise over a 2 hr and 20 minute period with the temperature ranging from −14° to −6° C. GC analysis showed no remaining NBBuOH. The resulting slurry was allowed to warm during 3 hrs to room temperature. 1000 ml water was then added. The phases were separated and the aqueous phase extracted with with 1000 ml dichloromethane. The combined dichloromethane extracts were washed with 2 times 1 L 1N HCl and then washed with 1000 ml brine, 1000 ml saturated NaHCO$_3$, and 2000 ml brine. The dichloromethane solution was dried over sodium sulfate, filtered, and rotary evaporated to give 1570 g (quantitative yield) of red-brown red-brown liquid. The NMR was consistent with structure and showed 5.4 wt % dichloromethane remaining. The GC analysis indicated 96.6% mesylate purity. Furthermore, the GC analysis was completed on a DB5 Column, 30 meters, 0.32 mm ID, ID, 0.25 μm film, heat from 75° C. to 300° C. @15° C./min, and held for 2 min @300° C. (Injector temperature: 250° C., Detector temperature: 350° C., Retention time: 11.216 minutes)

Endo-/Exo-Bromobutylnorbornene:

Lithium bromide (LiBr) (782 g, 9.0 mol) and 12 L of 2-pentanone were added to an appropriately sized container equipped with a thermowell, condenser with nitrogen adapter, and mechanical stirrer. The mixture was stirred yielding a yellow solution. Norbornene-butylmethanesulfonate (1570 g, ~6.01 mol) was dissolved in 2 L of 2-pentanone and added to the LiBr solution. An additional additional 4 L of 2-pentanone (total volume of 2-pentanone totaled 18 L) was added as rinse. The mixture was heated to reflux over a period of 1.5 hrs to yield a white slurry. Upon reaching reflux (101° C.), the GC analysis showed no starting material. The mixture was heated an additional hour at 101° C. and then cooled to 17° C. Two liters distilled water was added to clear the mixture. The mixture clouded again after a few minutes stirring, therefore, an additional 1 liter of water was added. The phases were separated. The reactor was rinsed with 2×1000 ml ethyl acetate. The aqueous phase was then extracted with two times 1 L ethyl acetate washes. The organic portions were combined and rotary evaporated at <30° C. to give 1579 g liquid and solids. The GC analysis showed 96.9% NBBuBr. The residue was mixed with 1 L dichloromethane and and 1 L water to dissolve all solids. The phases were separated. The organic portion was washed with 500 ml saturated sodium bicarbonate and 500 ml brine to pH 7. The organic portion was rotary evaporated to yield a 1419 g of a brown, clear oil. The NMR NMR analysis indicated 2.3 wt % of 2-pentanone still remaining. Ten ml of water was added and the material rotary evaporated again. However, the NMR indicated no reduction in 2-pentanone. The product was then dried over sodium sulfate, rinsed with with dichloromethane and rotary evaporated to give 1375 g (99.6% yield). GC indicated indicated 97.3% purity. The material was vacuum distilled through a 14" Vigreux column at 74.2-76.2° C. (0.22-0.53 Torr) to give 511.2 g with 98.5% purity, 379.4 g (69.3-76.0° C. at 0.164-0.33 Torr) with 97.5% purity, and 309 g (68-77° C. at 0.245-0.72 Torr) with 95-96% purity. The GC analysis completed on a DB5 Column, 30 meters, 0.32 mm ID, 0.25 μm film, heat from 75° C. to 300° C. at 15° C./min, hold for 2 min @ 300° C., Injector temperature: 250° C., Detector temperature: 350° C., Retention time: 8.584 and 8.616 minutes.

Example M6

Synthesis of Endo-/Exo-bromoethylnorbornene

Endo-/Exo-Norborneneethylmesylate:

5-(2-hydroxyethyl)norbornene (NBEtOH) (1000 g, 7.235 mol), 2000 ml dichloromethane, and methanesulfonyl chloride (871.6 g, 7.609 mol) were added to an appropriately sized container equipped with a thermowell, nitrogen inlet, addition funnel and mechanical stirrer. An extra 1500 mL dichloromethane was added to rinse in the methanesulfonyl chloride. The stirred mixture was chilled to −14° C. with a dry ice-isopropanol cooling bath. Triethylamine (883 g, 8.74 mol) was added rapidly dropwise over 70 minutes as the temperature ranged from −14° C. to −4° C. The reaction mixture became very thick, therefore, to improve mixing an additional 550 ml of dichloromethane was added. The GC analysis showed <0.3% NBEtOH. The resulting slurry was allowed to warm to room temperature while stirring overnight. The GC analysis showed 95.5% mesylate, 1.0% NBEtCl, and <0.2% NBEtOH. 1000 ml of water was added to clear the mixture. A second 500 ml portion of water was added, which clouded the mixture. The phases were separated and the aqueous phase extracted with two times 500 ml of dichloromethane. The combined dichloromethane extracts were washed with 1000 ml 1 N HCl, 1000 ml saturated NaHCO$_3$, and 2 times 1000 ml of brine. The dichloromethane solution was dried over sodium sulfate, filtered, and rotary evaporated to give approximately 1600 g (quantitative yield) of brown liquid. The NMR was consistent with structure and showed 1.4 wt % dichloromethane remaining. The GC analysis indicated 94.6% mesylate purity. The GC analysis was completed on a DB5 Column, 30 meters, 0.32 mm ID, 0.25 μm film, heat from 75° C. to 300° C. @15° C./min, hold for 2 min @300° C., Injector temperature: 275° C., Detector temperature: 350° C., Retention time: 7.856 minutes.

Endo-/Exo-Bromoethylnorbornene:

Lithium bromide (943 g, 10.83 mol) and 11.5 L 11.5 L of 2-pentanone were added to an appropriately sized container equipped with a thermowell, a condenser with nitrogen adapter, and a mechanical stirrer. The mixture was stirred to give a yellow solution. Norbornene-ethylmethanesulfonate (1604 g, ~7.235 mol) was dissolved in 3.5 L of 2-pentanone and added to the LiBr solution. An additional 1.5 L of 2-pentanone (total volume of 2-pentanone=16.5 L) was added as rinse. The mixture was heated to reflux over a period of 1.75 hours to give a slurry. Upon reaching reflux (99° C.), the GC analysis showed no starting material. The mixture mixture was heated an additional 30 minutes at 99-102° C. The mixture was then cooled cooled to 25° C. Two liters of distilled water was added to clear the mixture and followed with an additional 1 liter of water which clouded the mixture. The phases were were separated. The reactor was rinsed with two times 1000 ml portions of ethyl acetate. The aqueous phase was then extracted with two times 1000 ml ethyl acetate washes. The organic portions were combined and rotary evaporated at <30° C. When a a substantial amount of 2-pentanone was removed, 200 ml water was added and the mixture rotary evaporated at 45-50° C. This was done until no additional condensate was was recovered. This yielded 1630 g brown liquid. The residue was mixed with 1 L of dichloromethane and 1 L of water. The phases were separated. The organic portion was was washed with 500 ml saturated sodium bicarbonate and 1000 ml brine to pH 7. The organic portion was dried over sodium sulfate, filtered, and rotary evaporated to give 1416 g red-brown oil (96.8% yield). The NMR analysis indicated traces of 2-pentanone 2-pentanone and some dichloromethane still remaining. GC indicated 96.7% purity.

The material was initially vacuum-distilled through a 14" Vigreux column where the product retained a yellow coloration. An additional distillation through a 10" glass helix-packed produced slightly yellow-colored material. The distillates with 96-97.6% purity, totaling 605 g, were dissolved in 1000 ml of dichloromethane, boiled with Darco G-60 activated carbon, filtered, washed with two times 100 ml of 10% aqueous sodium bisulfate, 200 ml brine, a mixture of 100 ml saturated sodium bicarbonate and 100 ml brine, and two times 200 ml of brine. After drying over sodium sulfate, this was rotary evaporated to a nearly colorless material. Vacuum distillation through a 10" glass helix-packed column at 48-53° C. (0.69-0.95 Torr) gave 236 g colorless liquid with 98.3% purity and containing 0.3% NBEtCl, 0.3% NBEtOH, and 0.9% dihydroNBEtBr. Also obtained was 117 g colorless liquid with 97.4-97.8% purity and 168 g colorless liquid with 96.6-96.8% purity.

The distillates with >98% purity, totaling 576 g, were dissolved in 1000 ml dichloromethane, washed with 2×100 ml 10% aqueous sodium bisulfite, 200 ml brine, a mixture of 100 ml saturated sodium bicarbonate and 100 ml brine, and 2×200 ml brine. After drying over sodium sulfate, this was rotary evaporated to still give a yellow liquid. Vacuum distillation through a 10" glass helix-packed column at 48-54° C. (0.76-1.30 Torr) yielded 245 g colorless liquid with 98.2-98.5% purity and containing 0.3-0.6% NBEtCl, 0.4-0.6% NBEtdH, and 0.6-0.8% dihydroNBEtBr. Also collected were 35.7 g colorless liquid with 97.8% purity. The last two distillation cuts, totaling 266 g with >98% purity, were still slightly yellow and were redistilled through the 10" glass helix-packed column at 43-50° C. (0.46-1.00 Torr) to give 251 g of colorless liquid with 98.2-98.8% purity and containing <0.2% NBEtCl, <0.3% NBEtOH, and 0.8-1.5% dihydroNBEtBr. The overall yield was 733 g of >98% purity (46.8% yield), 153 g with 97.4-97.8% purity (9.8% yield), and 168 g with 96.6-96.8% purity (10.7% yield). GC analysis completed on a DB5 Column, 30 meters, 0.32 mm ID, 0.25 μm film, Heat from 75° C. to 300° C. at 15° C./min, hold for 2 min @ 300° C., Injector temperature: 250° C., Detector temperature: 350° C., Retention time: 4.305 and 4.332 minutes.

Example M7

Exo-bromomethylphenylnorbornene

Exo-hydroxymethylphenylnorbornene: An appropriate sized container was equipped with a thermowell, addition funnel, condenser with nitrogen inlet and mechanical stirrer. The RBF was charged with Pd(PPh$_3$)$_2$Cl$_2$ (29.2 g, 0.0416 mol) and (4-bromophenyl)methanol (194.6 g, 1.04 mol) in 1 L of DMF (drysolv) under nitrogen blanket to give a light yellow turbid solution and stirred at room temperature for 5 minutes. The addition funnel was charged with 383.4 g of norbornadiene (4.16 mol), added as neat over 5 minutes and followed by 435.2 mL of triethylamine (3.12 mol). Then the addition funnel was charged with formic acid (98.11 mL, 2.6 mol) and added to to the reaction mixture slowly at room temperature over 30 minutes and slight exotherm exotherm was observed (14° C. to 37° C.). The reaction mixture was heated to 70° C. and a a light orange solution resulted. At 70° C., an exotherm was observed and reaction temperature briefly reached 90° C. after which the temperature was maintained at 80° C. for 4 h. The reaction was monitored by gas chromatography (GC) (aliquot quenched with water water and extracted with MTBE). The reaction was complete after 4 h stirring at 80° C. The reaction was allowed to cool to room temperature and quenched with 2 L water and and diluted with 3 L methyl t-butyl ether. The phases were separated and the aqueous phase extracted with (2×1 L) methyl t-butyl ether. The combined organic layers were washed with (2×1 L) 10% hydrochloric acid, (2×500 mL) 5% lithium chloride aqueous aqueous solution, (2×1 L) brine and dried over sodium sulfate, filtered, and rotary evaporated under reduced pressure to give 391.9 g crude product as a light orange viscous oil. The 391.9 g crude product was adsorbed onto 400 g of silica and chromatographed over 3 kg of silica gel eluting with heptane (16 L), 5% ethyl acetate in in heptane (20 L), 7% ethyl acetate in heptane (12 L), 10% ethyl acetate in heptane (18 L), (18 L), 15% ethyl acetate in heptane (20 L) and 20% ethyl acetate in heptane (20 L). The The concentrated purified fractions yielded 99 g of product as light yellow viscous oil with 98.4% purity by GC and another fraction 73 g of product with 88.2% purity by GC. GC. Proton nuclear magnetic resonance spectroscopy ($^1$HNMR) and carbon-13 nuclear nuclear magnetic resonance spectroscopy ($^{13}$CNMR) were consistent with the desired structure. The combined yield for this reaction was 82.1% with >88.2% purity.

Exo-bromomethylphenyl norbornene: An appropriate sized container was equipped with a thermowell, stopper, condenser with nitrogen inlet and mechanical stirrer. The RBF was charged with exo-hydroxymethylphenylnorboronene (99 g, 0.49 mol) in 1 L of tetrahydrofuran (anhydrous) under nitrogen blanket to give a light yellow yellow solution and stirred at room temperature for 5 minutes. Then N-bromosuccinimide (105 g, 0.59 mol) and triphenylphosphine (154.8 g, 0.59 mol) was was added as solid to the reaction in two portions at 20° C. over 1 h (slight exotherm was was observed during N-bromosuccinimide/triphenylphosphine addition). A light brown brown solution resulted and the reaction was monitored by GC (aliquot quenched with water and extracted with methyl t-butyl ether). The reaction was complete after 1 h stirring at room temperature and the reaction mixture was poured into 7 L pentane and the triphenylphosphine oxide byproduct precipitated as an off white crystalline solid. This solid was filtered through a pad of magnesium sulfate and the filtrate was concentrated to give 148 g crude product as light brown liquid. The 148 g crude product product was again diluted with 2 L pentane to remove the residual triphenylphosphine oxide byproduct. The white turbid solution was filtered through a pad of magnesium sulfate and the filtrate was concentrated under reduced pressure to give 125.1 g of crude crude product as a brown liquid. The 125.1 g crude product was transferred to a 500 mL mL RBF and purified via Kugelrohr distillation at 125-135° C. oven temperature under vacuum 0.112-0.14 Torr to give 90.9 g of product with 98.2% purity by GC as a clear liquid. After keeping at room temperature the clear liquid turned dark brown, so the 90.9 g crude product was adsorbed onto 100 g of silica and chromatographed over 400 g of silica gel eluting with pentane (4 L), 2% ethyl acetate in pentane (4 L), 3% ethyl acetate in pentane (2 L) and 4% ethyl acetate in pentane (2 L). The concentrated purified purified fractions yielded 87 g (66.9%) of product as clear viscous oil with 98.8% purity purity by GC. $^1$HNMR and $^{13}$CNMR were consistent with the desired structure.

Example M8

Synthesis of 2-(bicyclo[2.2.1]hept-5-en-2-yl)-N,N,N-trimethylethanaminium bromide An appropriately sized container was charged under nitrogen with tetrahydrofuran (180 g, 202 mL), 2-bromoethyl norbornene (20.11 g, 100 mmol) and a stock solution of trimethylamine (45% aqueous 65.7 g 79.1 ml). The contents were stirred for 48 hours, at which time the solvents were removed under reduced pressure. A portion of drum grade toluene (200 ml, 173 g) was added. The solvents were then removed once again under reduced pressure with the toluene being useful to promote the azeotropic removal of water. The azeotropic removal of water was repeated with toluene (200 ml 173 g) and subsequently with heptane (200 ml, 136 g). The resulting powder was dried under vacuum for 18 hours.

The monomer was characterized by $^1$H NMR. The numbering system shown in the following figure was used for the assignment of the NMR signals.

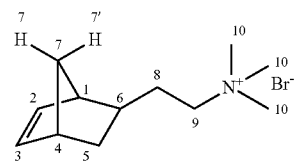

[1]NMR (500 MHz, CDCl$_3$): δ (ppm)=6.20 (dd, 1H, H$_{2\&3}$), 6.03 (dd, 1H, H$_{2\&3}$), 3.55-3.75 (2H, H$_9$), 3.4-3.55 (m, 9H, $H_{10}$) 2.84 (s, 1H, $H_{1\&4}$), 2.63 (s, $H_{1\&4}$), 2.05 (1H, $H_7$), 1.48 (2H, $H_5$), 1.38 (m, 1H, $H_6$), 1.21 (m, 2H, $H_8$), 0.59 (dd, 1H, J=12.02, $H_7$).

Example M9

Synthesis of 1,1'-(1,4-phenylene)bis(N,N-dimethyl-methanamine)

An appropriate sized container was equipped with a thermowell, condenser with a nitrogen inlet, addition funnel and mechanical stirrer. The RBF was charged with formic acid (297.3 g, 244 mL, 6.46 mol) and cooled to 10° C. 1,4-Bis (aminomethyl)benzene (88 g, 0.65 mol) was added portion wise to control the exotherm and gave a clear solution. The addition funnel was charged with 37 wt % aqueous formaldehyde (116.4 g, 315 mL, 3.88 mol) and added slowly over 15 minutes. The mixture was heated carefully (to avoid excessive foaming) to reflux over 30 minutes. A vigorous evolution of carbon dioxide was observed at 86° C., at which time the heating mantle was removed until the gas evolution notably subsided; heat was reapplied and the reaction mixture was stirred at ~90° C. for 18 h. After 18 h, aliquot GC indicated that the reaction was completed (95.2% product with 4.13% intermediate (1,1'-(1,4-phenylene)bis(N-methylmethanamine))). The reaction mixture was cooled to room temperature and added 5% excess reagents (formaldehyde/formic acid) and heated to reflux for another 24 h. Aliquot GC indicated no significant improvement in product purity so the reaction mixture cooled to room temperature and acidified with 500 mL 4N hydrochloric acid and the clear solution was evaporated to dryness under reduced pressure at 90° C. bath temperature to give 121 g of crude product as a white solid.

The white solid was dissolved in 200 mL water and basified with 250 mL 20% aqueous sodium hydroxide solution and extracted with 600 mL toluene. The phases were separated and the aqueous layer was extracted with (2×200 mL) toluene. The combined organics were washed with 500 mL brine, dried over sodium sulfate and filtered through a pad of magnesium sulfate. The filtrate was concentrated on the rotary rotary evaporator at 60° C. bath temperature to give 85.8 g (69.1% crude yield) product as as clear liquid with 96.1% purity and 3.5% intermediate (1,1'-(1,4-phenylene)bis(N-methylmethanamine)). The crude product was further purified by reacting the intermediate (1,1'-(1,4-phenylene)bis(N-methylmethanamine), (1,1'-(1,4-phenylene)bis(N-methylmethanamine)) with excess Na—$SiO_2$ and filtering through a pad of magnesium sulfate. The filtrate was diluted with toluene/methylene chloride and washed with water/brine, concentrated, and the crude material was further further purified via Kugelrohr distillation at 80-95° C. oven temperature under vacuum 0.45-0.55 Torr to give 71.8 g (57.8% yield) of product with >99.3% purity by GC as a clear liquid. $^1$HNMR, $^{13}$CNMR and MS were consistent with the desired structure.

A. Synthesis of Polymers

Examples P1a-1b

ROMP Mass Polymerization of HexNB/NBBuBr/NBBuNB

For the amounts of the various materials, see Table 1 below. 5-Hexylbicyclo[2.2.1]hept-2-ene (HexNB), 5-(4-bromobutyl)bicyclo[2.2.1]hept-2-ene (NBBuBr) and 1,4-di(bicyclo[2.2.1]hept-5-en-2-yl)butane (NBBuNB) were weighed and transferred into an appropriately sized container. A catalyst solution of [1,3-bis(2,4,6-trimethylphenyl)-2-imidazolidinylidene]-[2-[[(2-methylphenyl)imino]methyl]-phenolyl] chloro-(3-phenyl-indenylidene)ruthenium(II) in toluene was prepared in a separate vial. The catalyst solution was added to the monomer mixture. The polymerization mixture was poured into a petri dish. The mixture was heated at 80° C. for minutes and 130° C. for 30 minutes to complete.

Examples P2a-2b 2,3 Vinyl Addition Mass Polymerization

5-Hexylbicyclo[2.2.1]hept-2-ene (HexNB), 5-(4-bromobutyl)bicyclo[2.2.1]hept-2-ene (NBBuBr) and 1,4-di(bicyclo[2.2.1]hept-5-en-2-yl)butane (NBBuNB) were weighed and transferred into an appropriately sized container. A catalyst solution of (acetato-O)(acetonitrile)bis[tris(1-methylethyl)phosphine]palladium tetrakis(2,3,4,5,6-pentafluorophenyl)borate in toluene was prepared in a separate vial. The catalyst solution was added to the monomer mixture. The polymerization mixture was poured into a petri dish. The mixture was heated at 80° C. for minutes and 130° C. for 30 minutes to complete.

TABLE 1

| Polymerization* | | | | | | |
|---|---|---|---|---|---|---|
| Ex # | Ru Catalyst | Pd Catalyst | HexNB | NBBuBr | NBBuNB | Toluene |
| P1a | 0.015 | | 0.40 | 1.05 | 0.56 | 2.00 |
| P1b | 0.015 | | 0.78 | 0.73 | 0.51 | 2.00 |
| P2a | | 0.02 | 0.40 | 1.04 | 0.55 | 2.51 |
| P2b | | 0.02 | 0.76 | 0.73 | 0.51 | 2.52 |

*All values are in grams

Example(s) P3a-3l

Synthesis of NB-alkyl/NB-alkylbromide Polymers

Example P3a

Synthesis of 53% NB-EtBr/47% Hexyl NB Polymer

While the following is the specific procedure used for the synthesis of the named polymer, one of ordinary skill in the art will appreciate that such procedure can also be viewed as a general procedure for solution polymerization to produce the polymers listed in Table 2, or any other NB-alkyl/NB-alkylbromide type polymer, where the substitution of appropriate ratios of selected monomers, and appropriate amounts of catalyst and solvents are made.

An appropriately sized container was charged under nitrogen with drum grade toluene (510 g, 589.6 mL), 5-hexylbicyclo[2.2.1]hept-2-ene (Hexyl norbornene, 70.01 g, 392.6 mmol), 5-(4-bromobutyl)bicyclo[2.2.1]hept-2-ene (Bromobutyl norbornene, 29.99 g 130.9 mmol) and ethyl acetate (24.95 g, 27.66 ml). The mixture was held at 40° C. in a constant temperature oil bath, while being sparged with nitrogen for 15 minutes. A solution of Ni(toluene)$(C_6F_5)_2$ (3.17 g 6.54 mmol) in ethyl acetate (31.7 g 35.2 ml) was added in one portion to the vigorously stirred reaction mixture. The reaction was stirred vigorously and held at 40° C. for four hours, at which time the reaction was quenched by the addition of deionized water (10 ml). Residual nickel metal was removed by treatment of the reaction mixture with hydrogen peroxide (35% aqueous solution 10 g) and glacial acetic acid (97+%, 10 g) and stirring was continued for two hours while maintaining the temperature at 40° C.

The reaction mixture was transferred to a 1 L separatory funnel. The reaction solution was washed with deionized water (5×250 ml) utilizing tetrahydrofuran (90.2 g 100 ml) to break the emulsion formed during the washing process. The organic layer was decanted into a 2 L round bottomed flask and the solvents were removed under reduced pressure. The resultant mixture was a thick honey-like consistency. This thick thick solution was diluted with tetrahydrofuran (180.4 g 200 ml) and the resultant solution was added drop wise into methanol (1582 g 2000 ml) to precipitate the solid polymer. The solid polymer was collected by filtration of the resulting slurry. The filter-cake was washed with a portion of methanol (79.1 g 100 ml) and allowed to dry on on the filter for approximately one hour. The crudely dried polymer was transferred to a a crystallization dish, covered with a dust free paper, and dried for 18 hours in a vacuum vacuum oven set to 50° C. at a pressure of 25 torr. Overall yield was 99 g (99%) of dried solid. The polymer molecular weight by GPC was Mn=27, 501 a.m.u.; Mw=107,013 a.m.u.; PDI=3.89. The polymer composition as measured by $^1$H NMR was 53 mole % % norbornene ethyl bromide and 47 mole % hexyl norbornene.

ization/cross liking reaction was heated in a inert oven at 85° C. ° C. for 75 minutes followed by at 130° C. to complete the reaction.

Formation of Films

Film Example F1

Procedure for Casting Film and Amine/Hydroxide Treatment of the Film

Step 1: Preparation of Polymer Solution

The copolymer prepared example P3a (copolymer of HexNB/NBEtBr) of 20 grams was dissolved in tetrahydrofuran (24 grams, 45 wt %). The polymer solution was filtered through a 2.7 micron glass fiber filter.

Step 2: Preparation of Film

The filtered polymer solution was cast on a glass plate with 20 mil gap using a Gardco adjustable film applicator. The cast film was air dried at room temperature. The edges of film were lifted by a razor and the film was immersed to deionized water to lift off completely from the glass plate. The resulting film was wiped and air dried.

Step 3: Quarternarization of Film

A sample film was placed between PTFE flanges. The sample film was submerged in trimethylamine 50 wt % aque-

TABLE 2

| Ex# | Feed Ratio AlkylNB:AlkylbromideNB | Yield % | Mw | PDI | NMR Composition |
|---|---|---|---|---|---|
| P3a | 1 hexyl:1 ethyl bromide | 97 | 102,000 | 3.65 | 53% NB-EtBr 47% hexyl NB |
| P3b | ethyl bromide homopolymer | 95 | 65,300 | 3.30 | Homopolymer |
| P3c | 1 hexyl:1 Butyl bromide | 99 | 114,600 | 3.54 | 56% NB-BuBr 44% Hexyl NB |
| P3d | Butyl bromide homopolymer | 99 | 81,100 | 2.90 | Homopolymer |
| P3e | 1 hexyl:1 Butyl bromide | 99 | 86,900 | 3.50 | 58% NB-BuBr 44% Hexyl NB |
| P3f | 3 hexyl:1 Butyl Bromide | 99 | 107,000 | 3.90 | 30% NB-BuBr 70% hexyl NB |
| P3g | 3 Decyl:1 Butyl bromide | 99 | 99,000 | 2.85 | 28% NB-BuBr 72% Decyl NB |
| P3h | 3 Decyl:1 ethyl bromide | 99 | 94,800 | 2.80 | 34% NB-EtBr 66% Decyl NB |
| P3i | 1 Hexyl:1 ethyl bromide | 99 | 151,800 | 4.70 | 52% NB EtBr 48% Hexyl NB |
| P3j | 3 Hexyl:2 (endo-Me)(exo-CH$_2$Br) | 75 | 237,000 | 2.35 | 32% NB(endo-Me)(exo-CH$_2$Br) 68% Hexyl NB |
| P3k | 3 Hexyl:2 (endo-Me)(exo-CH$_2$Cl) | 61 | 143,800 | 1.73 | 28% NB(endo-Me)(exo-CH$_2$Cl) 72% Hexyl NB |
| P3l | 1 Hexyl:1 PhCH$_2$Br | 50 | 587,400 | 4.07 | 45% NBPhCH$_2$Br 55% Hexyl NB |

Example P4

Cross-Linked ROMP Polymerization

Exo-bromomethylphenylnorbornene (1.20 grams, 4.56 mmol) and hexyl norbornene (1.09 grams, 6.13 mmol) were weighed into a vial and toluene (13.0 grams) grams) was added. In a separate vial 1,1'-(1,4-phenylene)bis(N,N-dimethylmethanamine) (0.09 gram, 0.48 mmol) was weighed and toluene (2.0 grams) was added. In another vial dimethybenzylamine (0.49 (0.49 gram, 3.63 mmol) was weighed and toluene (5.0 grams) was added. In the last vial, vial, 1,3-Dimesitylimidazolidin-2-ylidene)(tricyclohexylphosphine) benzylidene ruthenium dichloride (39.5 mg, 0.046 mmol) was weighed and toluene (3.0 grams) was was added. All these solutions were mixed together and the mixed solution was cast in a a petri dish without delay. After 20 hours of slow evaporation of the solvent at room temperature, the polymerous solution for 47 hours. The amine treated film was air dried for 12 hours. The film was then vacuum dried at least for 8 hours.

Step 4: Anion Exchange of Quarternarized Film

The sample film was submerged in 1N NaOH aqueous solution for 20-30 minutes. The film was rinsed with deionized water and air dried.

Film Example F2

Procedure for Casting Film and Amine/Hydroxide Treatment of the Film

Step 1: Preparation of Polymer Solution

The copolymer prepared example P3e (copolymer of HexNB/NBBuBr) of 38 grams was dissolved in toluene (56 grams, 40 wt %). The polymer solution was filtered through a 1.0 micron PTFE filter.

Step 2: Preparation of Film

The filtered polymer solution was cast on a glass plate with 10 mil gap using a Gardco adjustable film applicator. The cast film was air dried at room temperature until no tack. The film was then heated in an inert oven at 60° C. for 1 hour, 100° C. for 1 hour, 130° C. for 16 hours and 150° C. for 1 hour. The edges of film were lifted by a razor and the film was immersed to deionized water to lift off completely from the glass plate. The resulting film was wiped and air dried.

Step 3: Quarternarization of Film

A sample film was placed between PTFE flanges. The sample film was submerged in trimethylamine 45 wt % aqueous solution for 24 hours. The amine treated film was air dried for 12 hours. The film was then vacuum dried at least for 8 hours.

Step 4: Anion Exchange of Quarternarized Film

The sample film was submerged in 1N NaOH aqueous solution for 20-30 minutes. The film was rinsed with deionized water and air dried.

Film Example F3

Procedure for Cross Linked Casting Film and Amine/Hydroxide Treatment of the Film Step 1: Preparation of Polymer Solution The copolymer prepared example P3e (copolymer of HexNB/NBBuBr) of 38 grams was dissolved in toluene (56 grams, 40 wt %). The polymer solution was filtered through a 1.0 micron PTFE filter. This polymer solution of 12 grams was added 1.55 grams of 1,1'-(1,4-phenylene)bis(N,N-dimethylmethanamine).

Step 2: Preparation of Film

The polymer solution was cast on a glass plate with 10 mil gap using a Gardco adjustable film applicator. The cast film was air dried at room temperature until no tack. The film was then heated in an inert oven at 60° C. for 1 hour, 100° C. for 1 hour, 130° C. for 16 hours and 150° C. for 1 hour. The edges of film were lifted by a razor and the film was immersed to deionized water to lift off completely from the glass plate. The resulting film was wiped and air dried.

Step 3: Quarternarization of Film

A sample film was placed between PTFE flanges. The sample film was submerged in trimethylamine 45 wt % aqueous solution for 24 hours. The amine treated film was air dried for 12 hours. The film was then vacuum dried at least for 8 hours.

Step 4: Anion Exchange of Quarternarized Film

The sample film was submerged in 1N NaOH aqueous solution for 20-30 minutes. The film was rinsed with deionized water and air dried.

Film Example F4

Procedure for Cross Linked Casting Film and Amine/Hydroxide Treatment of the Film Step 1: Preparation of Polymer Solution The copolymer prepared example P31 (copolymer of HexNB/NBPhCH$_2$Br) of 5.6 grams was dissolved in toluene (32 grams, 15 wt %). The polymer solution was filtered through a 1.0 micron PTFE filter. This polymer solution of 6.3 grams was added 0.17 gram of $N^1,N^1,N^3,N^3$,2,2-hexamethylpropane-1,3-diamine.

Step 2: Preparation of Film

The polymer solution was cast on a glass plate with 20 mil gap using a Gardco adjustable film applicator. The cast film was air dried at room temperature until no tack. The film was then heated in an inert oven at 60° C. for 1 hour, 100° C. for 1 hour, 130° C. for 16 hours and 150° C. for 1 hour. The edges of film were lifted by a razor and the film was immersed to deionized water to lift off completely from the glass plate. The resulting film was wiped and air dried. The cross linked film was not soluble in toluene.

Step 3: Quarternarization of Film

A sample film was placed between PTFE flanges. The sample film was submerged in trimethylamine 45 wt % aqueous solution for 64 hours. The amine treated film was air dried for 12 hours. The film was then vacuum dried at least for 8 hours.

Step 4: Anion Exchange of Quarternarized Film

The sample film was submerged in 1N NaOH aqueous solution for 20-30 minutes. The film was rinsed with deionized water and air dried.

Film Example F5

Control—No Added Amine

A 25 g sample of a copolymer of 5-(2-bromoethyl)-bicyclo[2.2.1]hept-2-ene (norbornenyl ethyl bromide, 48 mol %) and 5-hexylbicyclo[2.2.1]hept-2-ene (hexyl norbornene, 48 mol %) was weighed into a 500 mL amber glass bottle and 75 g of chloroform (Fisher, HPLC Grade) was added. The bottle was sealed and placed on a Wheaton laboratory roller at ambient temperature. The bottle was rolled at 50 rpm for 18 hours to produce a homogeneous, viscous solution. The polymer solution was filtered through a 0.5 micron Teflon filter using a 35 psig nitrogen back pressure and filtrate was collected in a low particle, 250 mL amber bottle. A 10 g aliquot of the polymer solution was poured into a 60 mm Pyrex Petri dish and covered with a glass lid to prevent rapid solvent evaporation. The Petri dish was placed in a fume hood and allowed to stand at ambient temperature for 18 hours. The surface of the resulting film was not tacky when touched. The Petri dish was transferred to a vacuum oven and dried under vacuum (23 inches Hg) at 40° C. for a further 18 hours. The resulting film was removed from the Petri dish by cutting the edge bead with a scalpel and immersing the film in 25 mL of deionized water. The film was then allowed to dry under ambient conditions. The resulting film weighed 1.30 g and was measured to be 97 microns thick.

Film Example F6

With Added N,N,N',N'-tetramethyl-1,6-hexanediamine

A 13.08 g aliquot of the polymer solution prepared in Example 1 was transferred into a 50 mL amber bottle. N,N,N',N'-tetramethyl-1,6-hexanediamine (0.775 g, 9.0 mmol) was added to the bottle containing the polymer solution and the bottle was sealed. The polymer solution was mixed by rolling at ambient temperature for 18 hours hours on a Wheaton laboratory roller at 50 rpm. A 5.71 g aliquot of the resulting viscous viscous solution was poured into a 60 mm Petri dish and covered with a glass lid to prevent rapid solvent evaporation. The Petri dish was placed in a fume hood and allowed allowed to stand at ambient temperature for 18 hours. The surface of the resulting film was not tacky when touched. The Petri dish was transferred to a vacuum oven and dried under vacuum (23 inches Hg) at 40° C. for a further 18 hours. The resulting film was removed from the Petri dish by cutting the edge bead with a scalpel and immersing immersing the film in 25 mL of deionized water. The film was then allowed to dry under under ambient conditions. The resulting film weighed 1.38 g and was measured to be 102 µm thick.

Film Example F7

Amine Treatment of P4 ROMP Cross Liked Film

ROMP film from the example P4 was submerged in trimethylamine 45 wt % solution for 24 hours. The amine treated film was rinsed with deionized water and the film was then vacuum dried at least for 8 hours.

B. Ionic Conductivity of the Film

Conductivity measurements are done in a four-point probe configuration using BekkTech conductivity clamp BT 110. The sample dimension is at least 2.0 cm in length and at most 1.2 cm in width. A sinusoidal voltage (10 mV) is applied to the outer two electrodes and the impedance across the inner two electrodes is measured using HP 4284A precision LCR meter. Thus, R=V/I at the inner electrodes. In the configuration, the contact resistance at the inner electrodes is negligible since the current flowing through them is nearly zero. The frequency of the sinusoidal voltage is varied and (typically 20 Hz to 1 MHz). The value of impedance is read at around the frequency where the phase angle is zero or nearly zero. This impedance Z is used to calculate the conductivity of films. The conductivity a is defined as follows:

$$\sigma = L/(Z*W*T)$$

(W is sample width, T is sample thickness, L is the distance of two electrodes)

A 0.05 to 0.1 gram sample of an AAEM membrane in hydroxide form was immersed in a 10 mL of 0.01 M HCl standard for 24 hours. The solutions were then titrated with a standardized NaOH solution. Control samples having no membrane added were also titrated with NaOH. The difference between the volume required to titrate the sample and the control was used to calculate the amount of hydroxide ions in the membranes.

The bromide form membrane was soaked in 1N NaOH solution for 20-30 minutes minutes for conversion to the hydroxide form membrane. The hydroxide form membrane was rinsed in deionized water and wiped off to remove water from the surface. The weight of this membrane was recorded. The membrane was dried under vacuum for 24 hours at room temperature. The difference of weights was used for water uptake.

In the Tables 3 and 4 below, where presented, the values for Theoretical Ion Exchange Capacity (IEC) have the dimension milliequivalents per gram (meq/g), the values for Water Uptake are in wt %, the values for Modulus and Strength are in MPa, the values for Elongation are in % and the values for Conductivity (COND) are in milliSiemens per centimeter (mS/cm). The mechanical properties of the wet hydroxide form AAEM samples were measured using Instron model 5564 (Instron Corporation, Norwood, Mass.) in accordance with the ASTM D822-D plastics standard.

TABLE 3

| Sample ID | Polymer Type | Polymer Composition | IEC NMR | Water Uptake | IEC Measured | Ion Conductivity 30° C. | Ion Conductivity 60° C. |
|---|---|---|---|---|---|---|---|
| F1 | AP | 47.5/52.5 HexNB/NBEtBr | 2.76 | — | — | 49.5 | 76.7 |
| F2 | AP | 55/45 HexNB/NBBuBr | 2.24 | 150 | 1.16 | 29.5 | 49.1 |
| F3 | AP | 55/45 HexNB/NBBuBr | 2.24 | 34 | 1.09 | 22.7 | 42.5 |
| F4 | AP | 55/45 HexNB/NBPhCH$_2$Br | 2.08 | 76 | 1.38 | 42.7 | 70.6 |
| P4 | ROMP | 55/45 HexNB/NBPhCH$_2$Br | 2.08 | — | — | 1.23 | 4.59 |
| F7 | ROMP | 55/45 HexNB/NBPhCH$_2$Br | 2.08 | — | — | 25.65 | 53.03 |

Table 3 provides a comparison of a quarternarized addition polymer P3I (HexNB/NBPhCH$_2$Br) to a quarternarized ROMP polymer system P4 where Ion Conductivity (IC) can be made equivalent. The addition polymer (AP) film was treated treated with $N^1,N^1,N^3,N^3$,2,2-hexamethylpropane-1,3-diamine and trimethylamine to give a crosslinked film with an IC value of 70.6 at 60° C. The 100% solids polymerized polymerized ROMP system crosslinked using 1,1'-(1,4-phenylene)bis(N,N-dimethylmethanamine) (P4) was similarly treated with trimethylamine to give a crosslinked film exhibiting an IC value of 53.03 at 60° C. The The IC of the addition polymer is the same or better than the ROMP polymer. While it is is only a single comparison, we believe it is indicative in general addition polymers can can yield IC's as high as reported by Coates without giving up the other benefits of addition polymerization.

TABLE 4

| Sample ID | Polymer Composition | Modulus | Strength | Elongation |
|---|---|---|---|---|
| F1 | 47.5/52.5 HexNB/NBEtBr | — | — | — |
| F2 | 55/45 HexNB/NBBuBr | 15 | 0.4 | 9.7 |
| F3 | 55/45 HexNB/NBBuBr | 297 | 5.6 | 2.2 |
| F4 | 55/45 HexNB/NBBuBr | 173 | 8.1 | 7.7 |
| P4 | 55/45 HexNB/NBPhCH$_2$Br | — | — | — |
| F7 | 55/45 HexNB/NBPhCH$_2$Br | — | — | — |

By now it should be realized that a variety of methods for making polymeric materials have been disclosed, where such polymeric materials are useful for forming membranes that are additionally useful for forming membranes that can be employed in forming an Alkali Fuel Cell that addresses the issues with previously known AFCs. For example, it is believed that an AFC that encompasses an AAEM made using a polymer embodiment in accordance with the present disclosure will be long-lived and resistant to being blocked or destroyed by carbonate formation as discussed above. Further it is believe that AAEMs made from the fully saturated polymer embodiments of the present disclosure will be more oxidatively stable than any AAEM made from an unsaturated polymer.

Additionally, it should be realized that the polymer embodiments in accordance with the present disclosure are also useful for forming elements of an AFC other than the the AAEM. For example, referring to paragraphs [0028] through [0039] in US Patent Application No. 2007/0128500, which is incorporated herein by reference in its entirety, entirety, it is disclosed that electrodes 2 and 4 of FIG. 2 encompasses active layers, respectively, and that each of such active layers 2a and 4a encompass an element conducting hydroxide ions. It is believed that some of the polymer embodiments in accordance with the present disclosure would be useful in forming this element of active active portions 2a and 4a.

We claim:

1. A ROMP norbornene-type polymer consisting essentially of:

a first type of repeating unit derived from a norbornene-type monomer represented by Formula I:

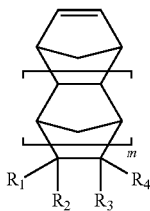

I where for Formula I, m is from 0 to 3, at least one of $R_1$, $R_2$, $R_3$ and $R_4$ is the pendent group represented by Formula III:

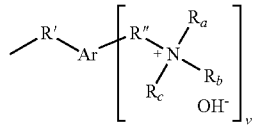

III where for Formula III, R' is selected from $-(CH_2)_p-$, where p is from 0 to 12; Ar is an aromatic group having one or more aromatic rings; R" is selected from $-(CH_2)_p-$ where p is as defined above, or $-(CH_2)_s-O-(CH_2)_t-$, where s and t are independently from 1 to 6, and R" is coupled to the nitrogen of the quaternary ammonium functional group by a covalent bond, each of $R_a$, $R_b$ and $R_c$ are independently selected from a methyl, an aryl or alkyl-aryl group where the alkyl is a $C_1$ to $C_4$ alkyl, and v is either 1 or 2, the others of $R_1$, $R_2$, $R_3$ and $R_4$ independently being a hydrogen, a $C_1$ to $C_{10}$ alkyl, an aryl or an alkyl-aryl group; and a second type of repeating unit derived from a norbornene-type monomer represented by Formula II:

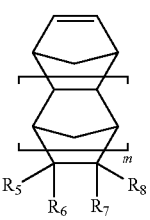

II where for Formula II, m is as defined above and at least one of $R_5$, $R_6$, $R_7$ and $R_8$ is selected from a substituted or unsubstituted maleimide-alkyl pendent group where the alkyl is a $C_1$ to $C_6$ alkyl or $NBCH_2OCH_2NB$, $NBCH_2-(OCH_2CH_2)_2OCH_2NB$, $NBCH_2-(OCH_2CH_2)_3OCH_2NB$, NB-NB, NB-Et-NB, NB-Bu-NB, NB-Hx-NB, $NBC_6H_4NB$ and $NBCH_2C_6H_4CH_2NB$, the others of $R_5$, $R_6$, $R_7$ and $R_8$ being independently selected from a hydrogen, a $C_1$ to $C_{11}$ alkyl or terminally halogenated alkyl, an $C_1$ to $C_{12}$-alkyl-aryl where the aryl portion is optionally halogenated or a methyl glycol ether $-CH_2-(OCH_2CH_2)_q-OMe$ where q is from 1 to 4.

2. A hydroxide conducting anionic alkali exchange membrane comprising the ROMP norborene-type polymer of claim 1.

3. An alkali fuel cell comprising the hydroxide conducting anionic alkali exchange membrane of claim 2.

4. An alkali fuel cell comprising the hydroxide conducting anionic alkali exchange membrane of claim 2 and a first electrode having an active layer where such active layer comprises the ROMP norborene-type polymer of claim 1.

* * * * *